Aug. 19, 1958   M. H. CORBIN ET AL   2,848,019
PAINT MIXING MACHINE
Filed Oct. 27, 1953   11 Sheets-Sheet 1
FIG.1
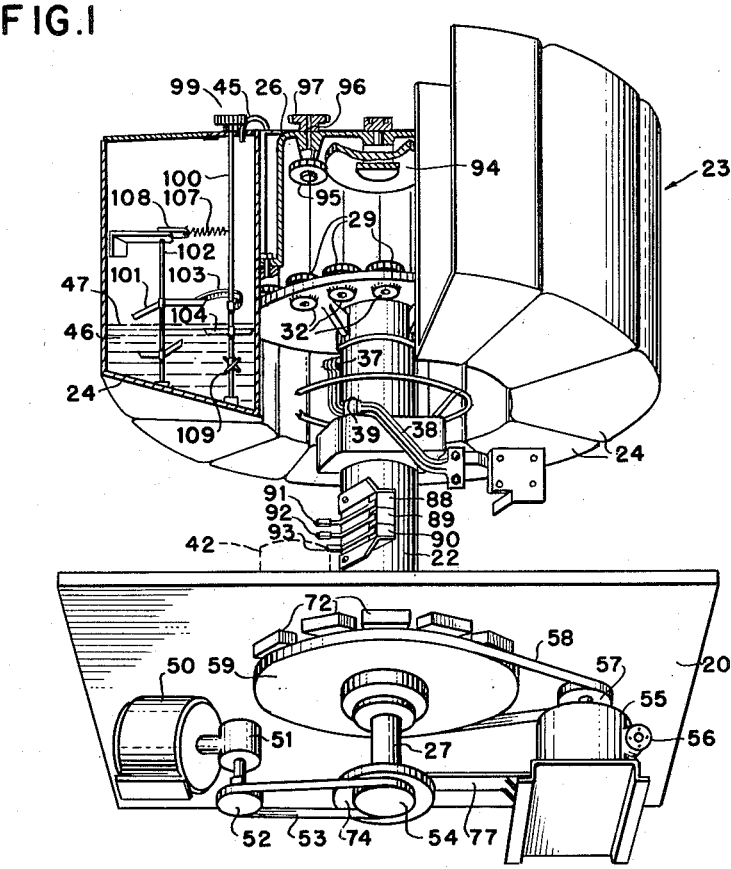
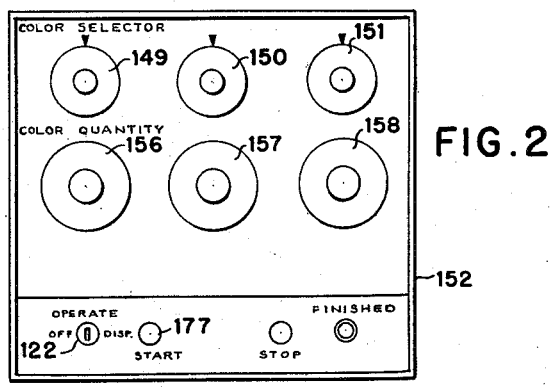
FIG.2
MILFORD H. CORBIN
ROBERT L. LIPPE
JOSEPH T. YATER
THOMAS E. GOODWIN
JOHN P. DRINJAK
EDMUND M. SQUIRE
INVENTORS.
BY
Richardson, David and Nordon
ATTORNEYS Aug. 19, 1958 M. H. CORBIN ET AL 2,848,019
PAINT MIXING MACHINE
Filed Oct. 27, 1953 11 Sheets-Sheet 2
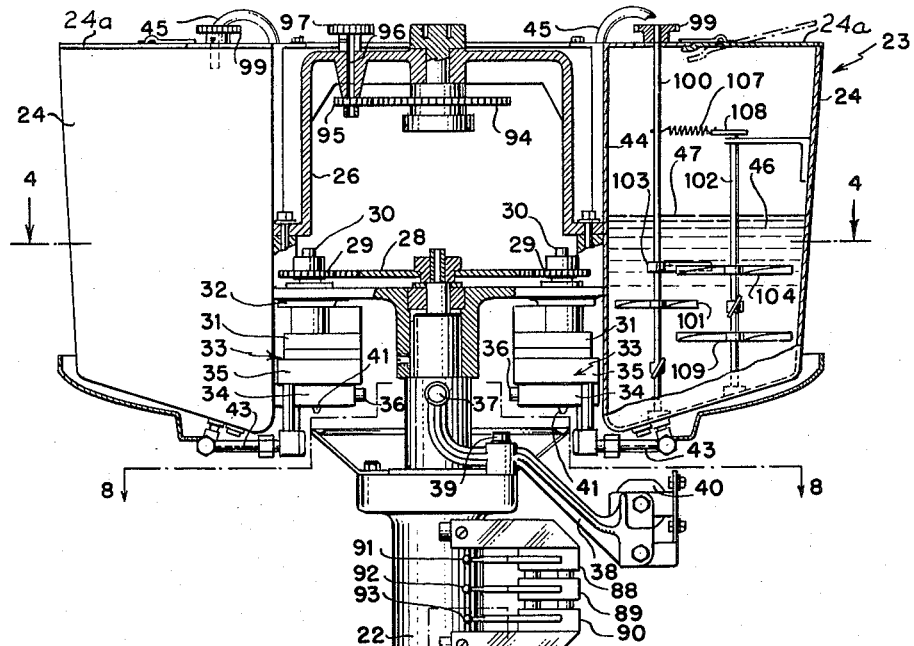
FIG.3
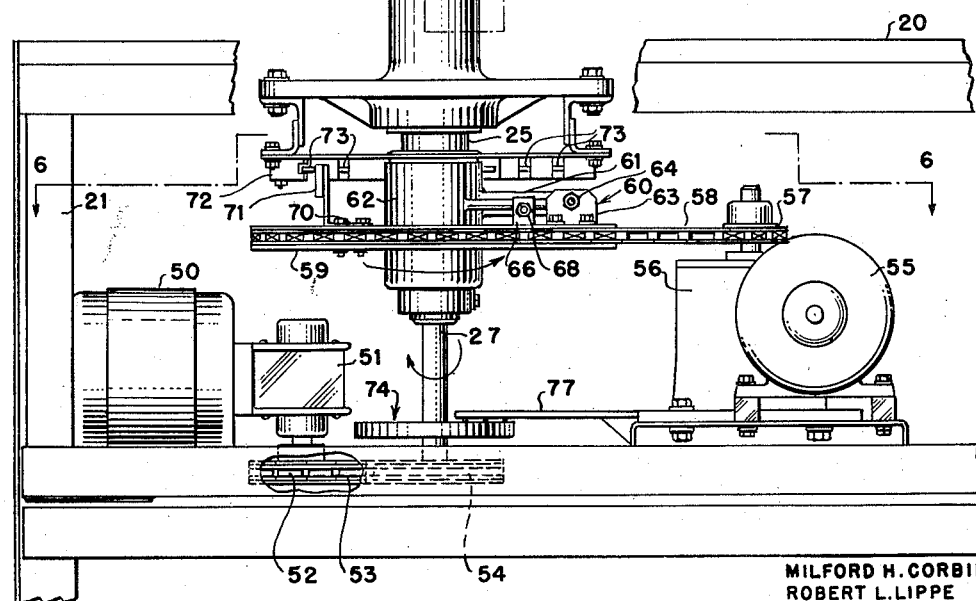
MILFORD H. CORBIN
ROBERT L. LIPPE
JOSEPH T. YATER
THOMAS E. GOODWIN
JOHN P. DRINJAK
EDMUND M. SQUIRE
INVENTORS.
BY
Richardson, David and Nordon
ATTORNEYS.

Aug. 19, 1958

M. H. CORBIN ET AL 2,848,019

PAINT MIXING MACHINE

Filed Oct. 27, 1953

MILFORD H. CORBIN
ROBERT L. LIPPE
JOSEPH T. YATER
THOMAS E. GOODWIN
JOHN P. DRINJAK
EDMUND M. SQUIRE

INVENTORS.

BY
Richardson, David and Nordon

ATTORNEYS.

Aug. 19, 1958     M. H. CORBIN ET AL     2,848,019
PAINT MIXING MACHINE

Filed Oct. 27, 1953     11 Sheets-Sheet 4

MILFORD H. CORBIN
ROBERT L. LIPPE
JOSEPH T. YATER
THOMAS E. GOODWIN
JOHN P. DRINJAK
EDMUND M. SQUIRE
*INVENTORS.*

BY
*Richardson, David and Nordon*

ATTORNEYS.

Aug. 19, 1958    M. H. CORBIN ET AL    2,848,019
PAINT MIXING MACHINE

Filed Oct. 27, 1953    11 Sheets-Sheet 5

MILFORD H. CORBIN
ROBERT L. LIPPE
JOSEPH T. YATER
THOMAS E. GOODWIN
JOHN P. DRINJAK
EDMUND M. SQUIRE
INVENTORS.

BY Richardson, David and Nordon

ATTORNEYS.

Aug. 19, 1958   M. H. CORBIN ET AL   2,848,019
PAINT MIXING MACHINE
Filed Oct. 27, 1953   11 Sheets-Sheet 7

MILFORD H. CORBIN
ROBERT L. LIPPE
JOSEPH T. YATER
THOMAS E. GOODWIN
JOHN P. DRINJAK
EDMUND M. SQUIRE

INVENTORS.

BY
Richardson, David and Vordon

ATTORNEYS.

Aug. 19, 1958 M. H. CORBIN ET AL 2,848,019
PAINT MIXING MACHINE
Filed Oct. 27, 1953 11 Sheets-Sheet 8

MILFORD H. CORBIN
ROBERT L. LIPPE
JOSEPH T. YATER
THOMAS E. GOODWIN
JOHN P. DRINJAK
EDMUND M. SQUIRE
INVENTORS.

BY
Richardson, David and Verdon
ATTORNEYS.

Aug. 19, 1958

M. H. CORBIN ET AL 2,848,019

PAINT MIXING MACHINE

Filed Oct. 27, 1953

MILFORD H. CORBIN
ROBERT L. LIPPE
JOSEPH T. YATER
THOMAS E. GOODWIN
JOHN P. DRINJAK
EDMUND M. SQUIRE
INVENTORS.

BY
Richardson, David and Nordon

ATTORNEYS.

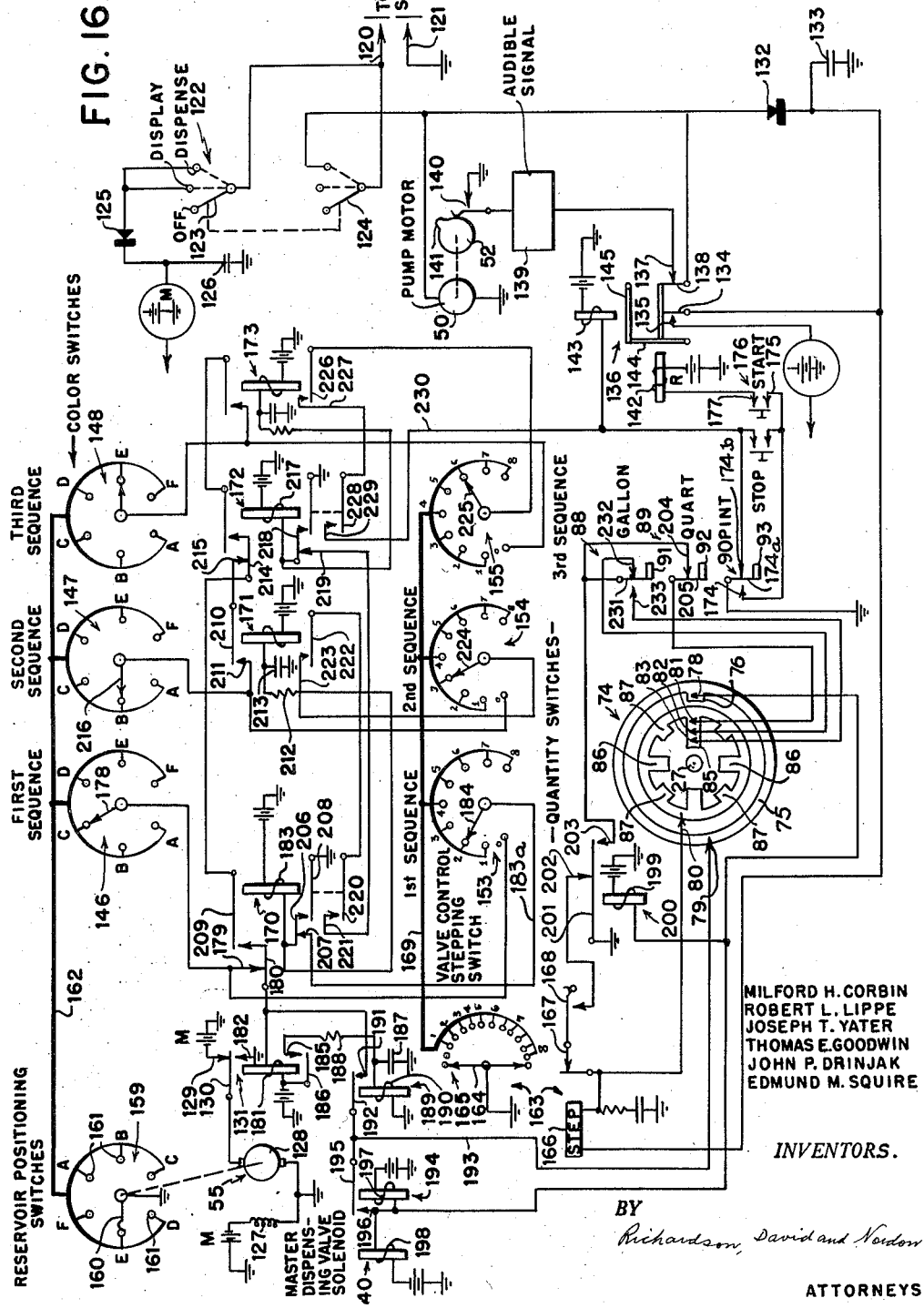

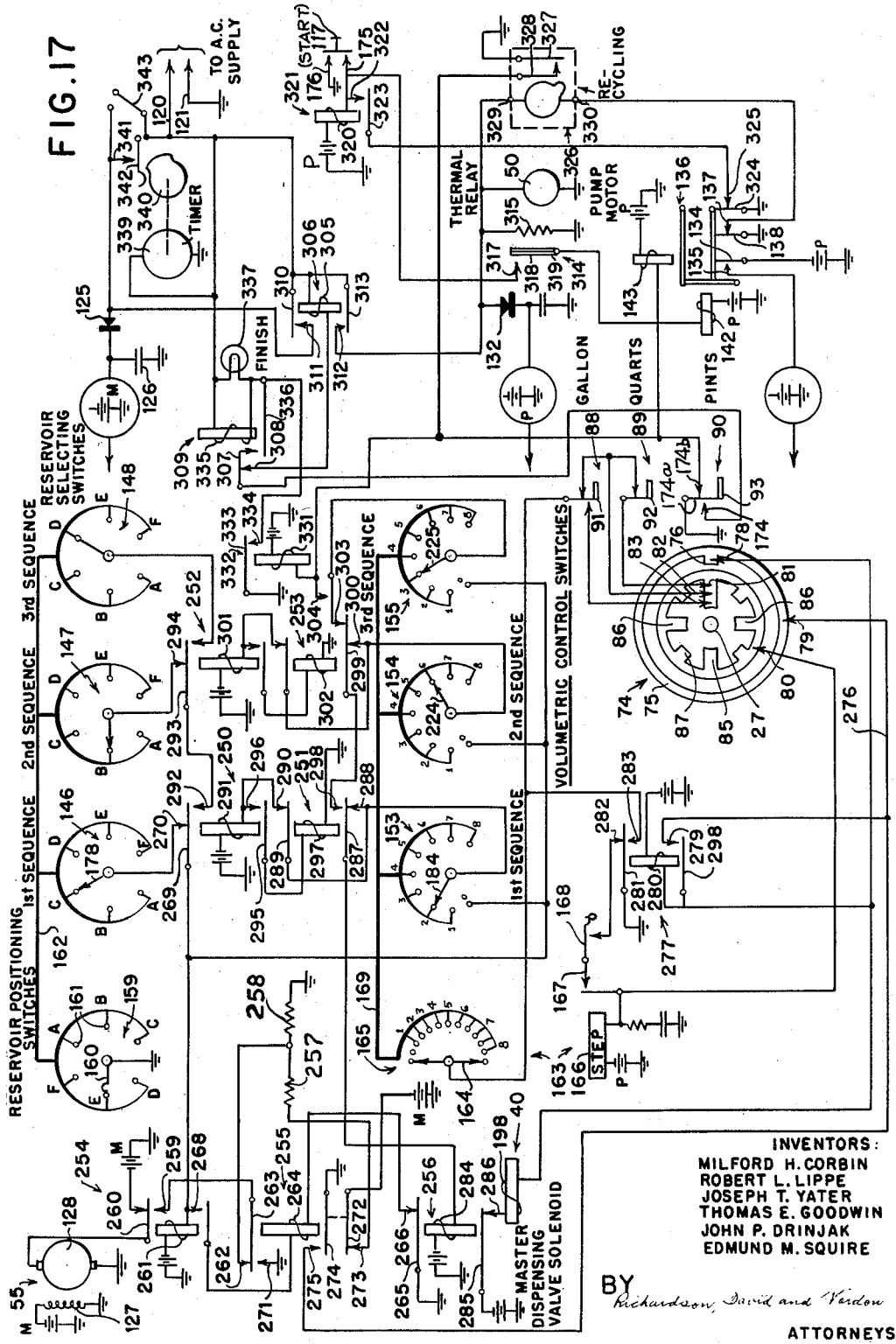

United States Patent Office 2,848,019
Patented Aug. 19, 1958

2,848,019

PAINT MIXING MACHINE

Milford H. Corbin and Robert L. Lippe, New York, Joseph T. Yater, Staten Island, Thomas E. Goodwin, Baldwin, John P. Drinjak, Uniondale, and Edmund M. Squire, New York, N. Y., assignors, by mesne assignments, to Color Carousel Corp., Staten Island, N. Y., a corporation of California Application October 27, 1953, Serial No. 388,554

39 Claims. (Cl. 141—100)

The present invention relates to liquid dispensing apparatus and more particularly to devices of this character adapted to dispense accurately measured preselected volumes of each of a plurality of standardized liquids such as pigment bearing fluids for producing paints of accurately predetermined chromaticities.

The invention represents certain improvements in the liquid dispensing apparatus shown and described in the copending application of Stewart Stiner et al., for Paint Mixing Machines, Serial No. 282,652, filed April 16, 1952, now Patent No. 2,787,402, dated April 2, 1957, the present improvements being a character simplifying and facilitating manufacture of the dispensing apparatus commercially, reducing maintenance and improving operation of the apparatus.

An object of the invention is to provide a liquid dispensing apparatus in which a plurality of liquids are available in individual storage reservoirs, each reservoir being equipped with agitating means arranged to prevent the formation of surface film and to keep any suspended particles from settling to the bottom of the reservoirs so that each liquid is stirred into a state of homogeneity before dispensing operation is commenced.

A feature of the invention resides in the provision of agitating means which acts on the entire surface of the liquid and throughout its entire volume.

A further object of the invention is the provision of dispensing apparatus in which volumetric control of the amount of each liquid dispensed is obtained by counting apparatus arranged to operate in conjunction with an electrical commutator driven conjointly with gear pumps or other positive displacement pumping means having an accurately predetermined volumetric displacement for a predetermined amount of pump drive shaft rotation.

Another object of the invention is the provision of electrical control circuits which comprise switching apparatus of the general type used in automatic telephone systems, such switching apparatus being inherently designed for long life and reliable operation.

Another object of the invention is the provision of liquid selecting and volumetric control circuits in which the selecting switches may be of conventional single pole multi-point construction and of low current carrying capacity.

A further object of the invention is to provide a direct current motor for positioning a preselected reservoir for dispensing liquid therefrom, together with control means utilizing dynamic braking of the motor to assure accurate positioning of the preselected container.

Still another object of the invention is the provision of control means actuated by an empty or partially filled container while it is in correct dispensing position to receive liquids from the machine, both for permitting the dispensing to commence, and for automatically shutting off the dispensing action if the container should be removed before the dispensing action has been completed.

A further object of the invention is the provision of additional container actuated control means responsive to the dimensions of a particular container, whereby the amount of liquid dispensed for a certain setting of the controls of the apparatus will be proportioned to the container capacity without the need for manually including the proper container capacity factor in the control settings. In this manner, the same combination of control settings may always be used for dispensing certain liquids in certain proportions, without modifying the settings in accordance with the container capacity.

A further object of the invention is the provision of a commutator including various contact segments together with brushes which engage certain segments, the brushes being connected through switching means responsive to the dimensions of a container which is to receive liquid from the apparatus for proportioning the total amount of liquid dispensed in accordance with the container capacity, synchronizing means being provided to assure that the dispensing operation of the apparatus always commences at a predetermined reference position of the commutator.

Still another object of the invention is the provision of time delay means interposed between the reservoir positioning means and the synchronizing means for assuring that the desired reservoir has come to rest in the dispensing position before dispensing can commence.

Another object of the invention is the provision of timing means for periodically operating the recirculating and agitating means in order to prevent sedimentation and formation of surface film when the apparatus stands idle for long periods of time.

Still another object of the invention is the provision of timing means for assuring a minimum interval of high speed pump operation before dispensing can commence and for stopping the high speed pump operation unless dispensing is commenced within a maximum time interval of high speed pump operation.

Another object of the invention is the provision of means for terminating high speed pump operation after dispensing has been completed, in order to avoid unnecessary wear on the pumps and on the pump driving mechanism.

Other and further objects will become apparent upon reading the following specification together with the accompanying drawing forming a part hereof.

Referring to the drawing:

Figure 1 is a perspective view of dispensing apparatus embodying the invention, viewed looking in a partially upward direction, portions of the apparatus being broken away to illustrate details of construction.

Figure 2 is an elevational view of a control panel for preselecting the particular liquids and the quantities of each liquid to be dispensed.

Figure 3 is an elevational view, partly in section, of the apparatus shown in Fig. 1.

Figure 16 is a schematic electrical circuit diagram showing the control circuits of the dispensing apparatus.

Figure 17 is a schematic electrical circuit diagram similar to Fig. 16 showing a modified form of control circuit.

Figure 4:
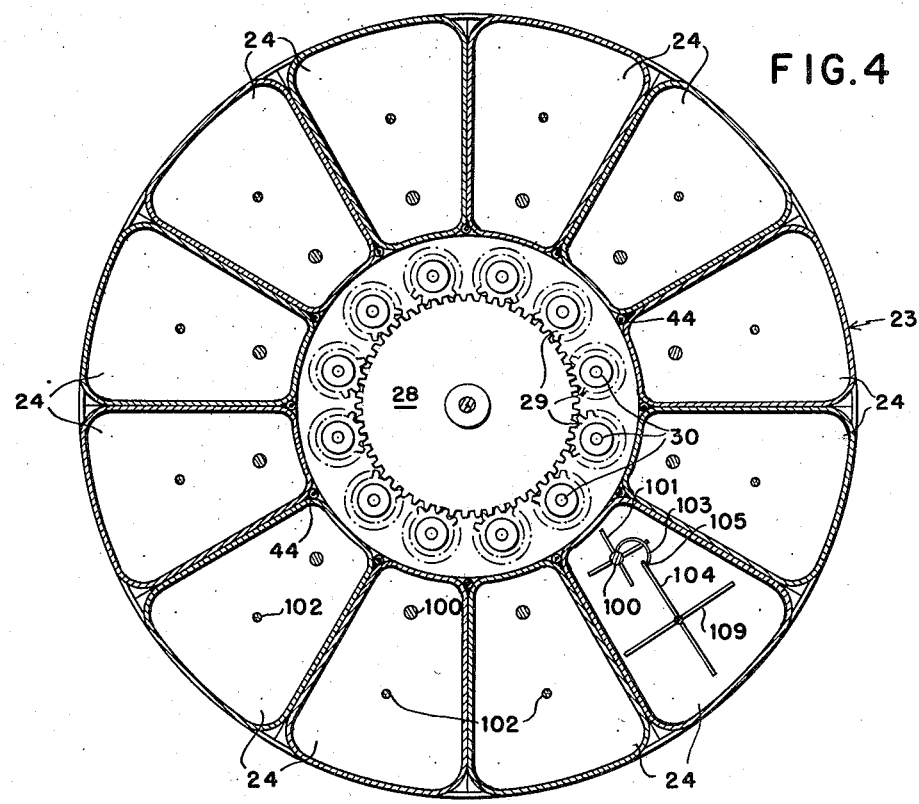
Figure 4 is a plan sectional view taken along the line 4—4 of Fig. 3.
Figure 10:
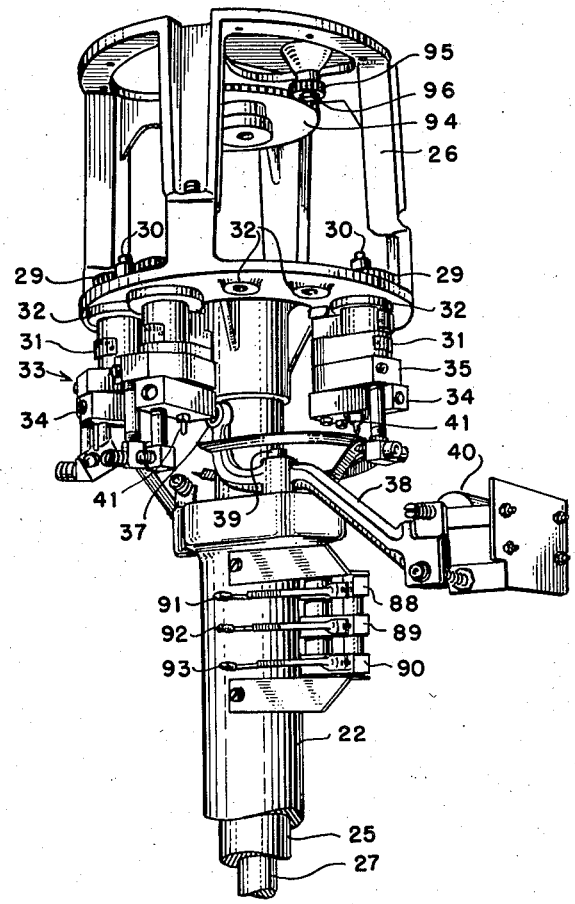
Figure 10 is a perspective view of supporting hub structure for the reservoir unit illustrating the arrangement of the dispensing valves and a master valve control magnet.

Referring to Fig. 1, the dispensing apparatus comprises a flat rectangular base member 20 supported on a framework 21 (Fig. 3) which rests on the floor. Mounted on base member 20 is an upright supporting column 22 which carries a rotatable reservoir unit designated generally as 23. The reservoir unit 23 comprises a group of individual wedge shaped reservoirs 24 disposed in an annular arrangement. Each reservoir 24 is individually provided with a pivotally mounted lid 24a which may be tilted to the position shown in dotted lines in Fig. 3 for filling the reservoir. Suitably journaled in upright column 22 is a vertical hollow shaft 25. Fixed to the upper end of hollow shaft 25 is a reservoir unit hub frame 26 (Fig. 10). The individual reservoirs 24 are arranged around the hub frame 26 to rotate with hollow shaft 25. An inner pump drive shaft 27 extends vertically within the hollow shaft 25 and at its upper end a pump driving gear 28 (Fig. 3) is fixedly secured thereto. The pump driving gear 28 meshes with a plurality of pinions 29 (Fig. 4). Each pinion 29 is secured to the operating shaft 30 of an individual gear pump 31 (Fig. 10). A positive displacement gear pump 31 is provided for each individual reservoir 24 and each pump is mounted beneath the reservoir unit hub 26 by means of a flange 32. The volumetric displacement of each gear pump 31 is accurately proportional to the amount of rotation of its operating shaft 30.

A dispensing valve 33 comprising a valve body 34 and an adapter plate 35 is mounted beneath each gear pump 31. Each valve 33 comprises an inwardly spring pressed actuating member 36 which is moved radially outwardly with respect to the reservoir unit 23 for dispensing liquid from a particular container which is in dispensing position. Such radial outward movement is produced by the free end 37 of a master dispensing valve control lever 38. Valve control lever 38 is pivotally mounted on a pin 39 fixed to the upper portion of supporting column 22. Pivotal movement of valve control lever 38 is produced by energization of a master valve control solenoid designated generally as 40, whereupon the free end 37 of valve control lever 38 engages the actuating member 36 of the valve 33 associated with the particular reservoir 24 which is in dispensing position. Liquid 46 (Fig. 1) then flows through gear pump 31, adapter plate 35, dispensing valve 33 and a discharge pipe 41 which extends downwardly from the adapter plate 35. Under these conditions, the discharge pipe 41 is positioned above a container 42 which is to receive the liquid.

During operation of the pumps 31, the valves 33 normally cause the liquid 46 in each reservoir to flow in a closed circulatory path including the pump and comprising a discharge conduit 43 (Fig. 3) connected to the bottom of each reservoir 24, the valve 33, and a reservoir inlet conduit 44 which terminates at its upper end in a goose neck 45 which directs the liquid back into the upper portion of the reservoir 24 and onto the upper surface 47 of the liquid.

Driving mechanism for the dispensing apparatus is disposed beneath the base member 20 and mounted on the framework 21. The driving mechanism comprises a pump motor 50 (Fig. 1) connected through speed reducing gearing 51 to a sprocket wheel 52. Sprocket wheel 52 is connected through an endless chain 53 to drive a further sprocket wheel 54 fixed to the lower end of pump drive shaft 27. As hereinafter described in greater detail, the pump motor 50 operates the gear pumps 31 at relatively high speed during dispensing operation of the apparatus.

A direct current shunt motor 55 (Fig. 3) is provided for rotating the reservoir unit 23 during display operation of the apparatus and when selecting a particular reservoir 24 of the reservoir unit 23 from which liquid is to be dispensed. The reservoir unit drive motor 55 is connected through speed reducing gearing 56 to a sprocket wheel 57. Sprocket wheel 57 is connected through an endless chain 58 to drive a large diameter sprocket wheel 59. Large diameter sprocket wheel 59 is freely rotatably mounted adjacent to the lower end of hollow shaft 25 and is connected to drive the hollow shaft 25 through a shock absorber designated generally as 60.

Figure 6:
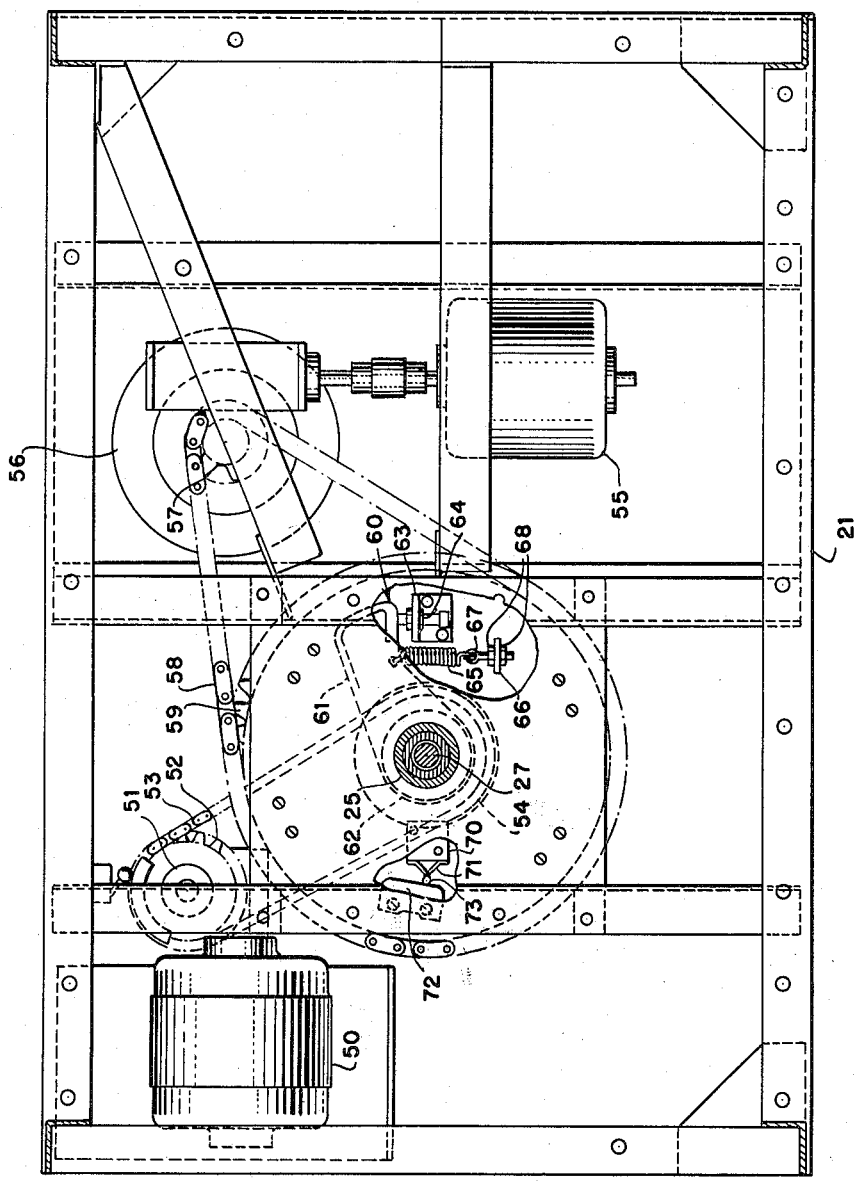
Figure 6 is a plan sectional view taken along the line 6—6 of Fig. 3.

The shock absorber 60 comprises a radially outwardly extending arm 61 fixed to the hollow shaft 25 by means of a collar 62. An L-shaped bracket 63 (Fig. 6) is fixed to the large sprocket wheel 59 and an adjustable stop screw 64 threaded in an upright arm of the L-shaped bracket 63 engages the outer end portion of arm 61 for driving the hollow shaft 25 to rotate the reservoir unit 23. When the reservoir unit drive motor 55 is abruptly stopped by dynamic braking action, as described in detail below, it causes sudden stoppage of the large sprocket wheel 59. The weight of the reservoir unit 23 is considerable. In order to avoid undue shock stresses which would otherwise accompany this sudden stoppage by reason of the inertia of the reservoir unit 23, a helical tension spring 65 is provided having one of its ends connected to a further L-shaped bracket 66 carried by the large sprocket wheel 59 and its other end connected to the shock absorber arm 61. The reservoir unit 23 is thus allowed to overtravel against the yielding tension of spring 65 when the direct current drive motor 55 is abruptly stopped. Tension spring 65 is connected to bracket 66 by means of an adjustable eyebolt 67 whose position may be fixed by means of locknuts 68, thus permitting adjustment of the normal tension in spring 65. After the overtravel has been completed, the reservoir unit is drawn back by spring 65 into an angular position which may be adjusted to a limited extent by means of stop screw 64, this position being a dispensing position for a particular one of the reservoirs which had been preselected as described in greater detail below.

Figure 15:
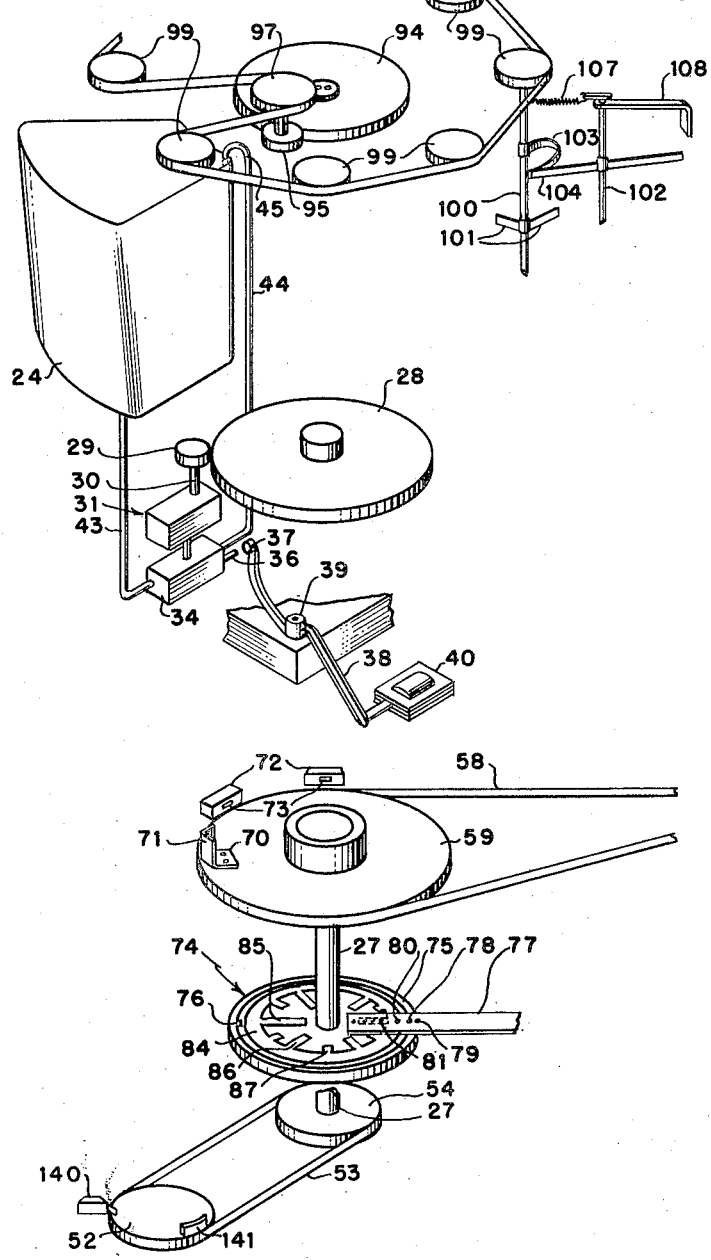
Figure 15 is a diagrammatic fragmentary perspective view showing the relative arrangement of the control elements of the apparatus of Fig. 1.

Mounted on large sprocket wheel 59 is an L-shaped bracket 70 with an upright switch actuating portion 71 of V-shaped cross section having a rounded radially outwardly directed apex. A plurality of reservoir unit positioning switches 72 (Fig. 15) are arranged in a horizontal ring around the circumference of a circle concentric with hollow shaft 25, each switch being provided with a radially inwardly directed actuating stud 73 engageable by the upright switch actuating portion 71 of L-shaped bracket 70 once during each revolution of large sprocket wheel 59. This may also be seen in Fig. 3.

In the embodiment of the invention illustrated in the drawing, there are shown a total of twelve individual reservoirs 24 which are substantially identical and are regularly arranged within the reservoir unit 23. Accordingly, there are twelve equally circumferentially spaced reservoir positioning switches 72, one for each individual reservoir 24, actuation of a particular preselected reservoir positioning switch 72 causing the revolving reservoir unit 23 to stop with the corresponding reservoir in dispensing position.

Figure 11:
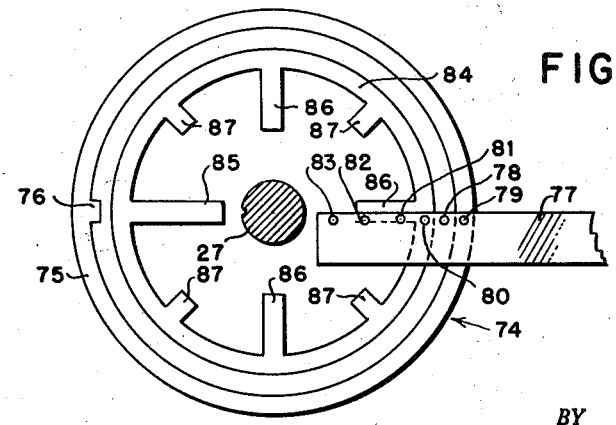
Figure 11 is an enlarged plan view of an electrical commutator for volumetric control of the dispensing action of the apparatus.

Fixed to the lower end portion of gear pump drive shaft 27 is a flat disc-shaped commutator 74. As may best be seen in Fig. 11, the upper surface of commutator 74 comprises a flat annular outer contact ring member 75 with a short radially inwardly directed synchronizing contact projection 76. Mounted in a suitable elongated radially extending brush holder 77 are two synchronizing circuit brushes 78 and 79. The outer brush 79 is in continuous contact with outer contact ring 75 and the inner synchronizing circuit brush 78 engages the inward synchronizing contact projection 76 for a short interval once during each revolution of pump drive shaft 27.

Mounted along the inner portion of brush holder 77 is a row of four counting circuit brushes 80, 81, 82 and 83. An inner contact ring 84 on the upper surface of commutator 74 is in continuous engagement with the common counting circuit brush 80. Extending radially inwardly from inner contact ring 84 are eight separate angularly spaced projections of which the longest, 85, makes contact with the innermost counting circuit brush 83 only once during each complete revolution of pump drive shaft 27. Three projections 86 of intermediate length are spaced at 90° intervals from the longest projection 85 and these, together with the longest projection 85 close a circuit four times during each revolution of pump drive shaft 27 between a counting circuit brush 82 and the common counting circuit brush 80. The projections of intermediate length 86 are too short to engage the innermost counting circuit brush 83 at any time.

Four short contact projections 87 extend inwardly from inner contact ring 84, these short projections 87 being spaced at 90° intervals from each other and at 45° intervals from the projections of intermediate length 86 and the longest projection 85. The outermost portions of all eight projections, 85, 86 and 87 cooperate to close a circuit eight times during each revolution of pump drive shaft 27 between counting circuit brushes 80 and 81. The four short projections 87 which engage brush 81 are too short to engage either of the two inwardly disposed counting circuit brushes 82 or 83. A circuit is therefore closed four times per revolution of pump drive shaft 27 between brush 82 and common brush 80. Similarly a circuit is closed a single time per revolution between brush 83 and common brush 80.

Three container switches 88, 89 and 90 (Fig. 10) are mounted on upright post 22 and are provided with actuating arms 91, 92 and 93 respectively. The actuating arms 91, 92 and 93 are mutually spaced vertically above the upper surface of base 20 and arranged in a vertical row for selective engagement with containers of three different volumetric capacities and which have sensibly different heights. In the embodiment of the invention illustrated, it is contemplated that the uppermost actuating arm 91 can be engaged only by the tallest container which is assumed to be a one gallon container. A one gallon container will thus actuate all three container switches. A one quart container, which is shorter than a one gallon container, will actuate the two lower container switches 89 and 90 by engagement with the two lower actuating arms 92 and 93. A one pint container will actuate only the lowermost switch 90 by engagement with actuating arm 93.

The dispensing apparatus has two conditions of operation. In one of these conditions, designated "Display," the reservoir unit 23 rotates continuously being driven by the shunt motor 55. The pump motor 50 is stopped so that the pump drive shaft 27 and gear 28 fixed to its upper end remain stationary. The individual pump operating pinions 29 move around the drive gear 28 driving their respective pumps at relatively low speed and producing a continuous recirculation of the liquid in each of the reservoirs 24, thereby preventing sedimentation or the settling of any solids suspended in the various liquids.

In certain instances, it has been found to be desirable to supplement the recirculating action of the pumps by the provision of individual agitating means in each reservoir, particularly in situations where there is a tendency for a film or scrum to form at the upper surface 47 of the liquid 46 where it is in contact with the surrounding air. Mounted in the upper portion of reservoir unit hub frame 26 (Fig. 10) is a stationary agitator drive gear 94, the gear 94 being freely rotatable with respect to the hub frame 26, but held stationary by any suitable means (not shown).

Figure 7:
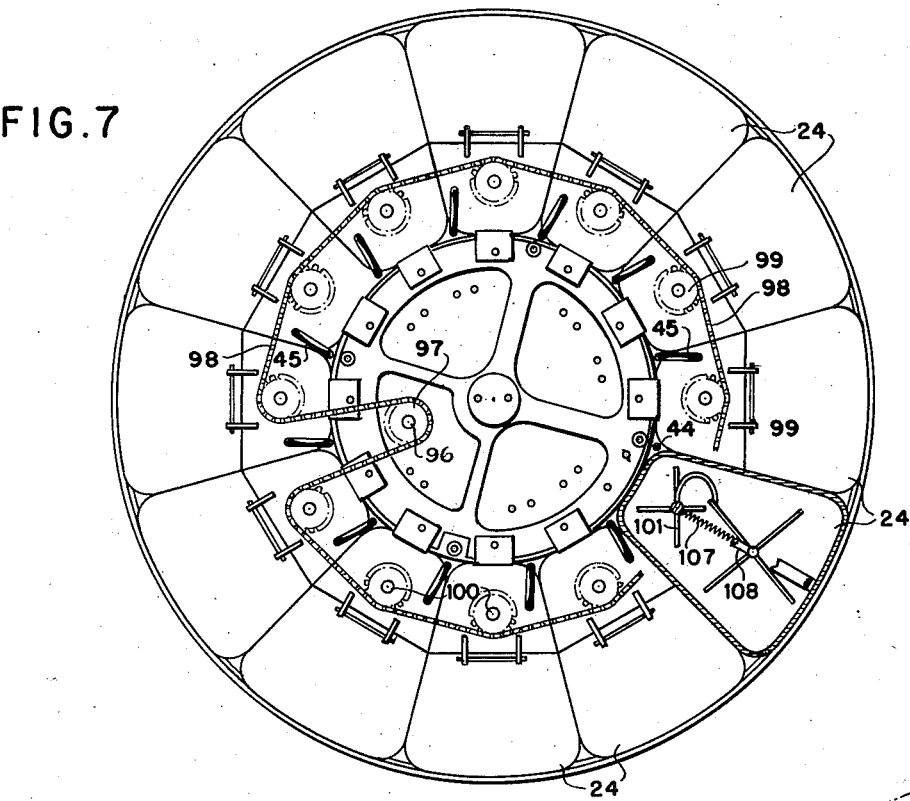
Figure 7 is a plan view of a reservoir unit which forms a part of the apparatus shown in Fig. 1.
Figure 8:
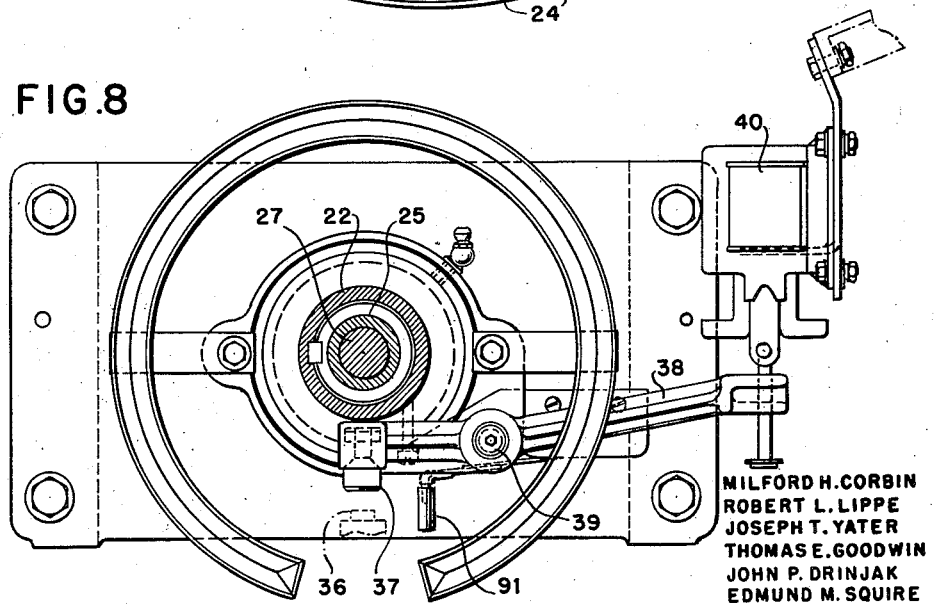
Figure 8 is an enlarged plan sectional view taken along the line 8—8 of Fig. 3.
Figure 9:
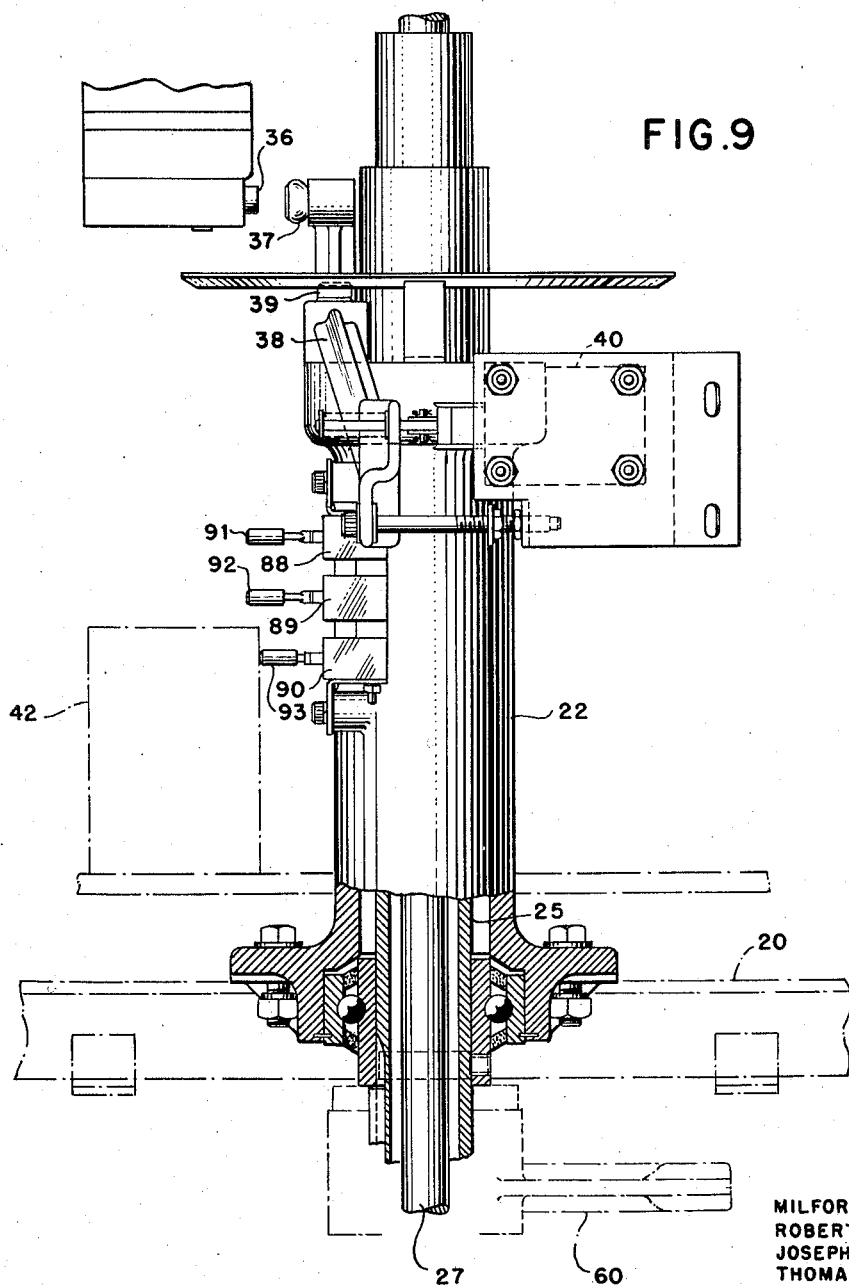
Figure 9 is an enlarged fragmentary elevational view, partly in section, of supporting structure for the reservoir unit.

A pinion 95 meshes with the stationary driving gear 94 and is mounted at the lower end of a vertical shaft 96 suitably journaled in hub frame 26. A sprocket wheel 97 (Figs. 7, 15) is fixed to the upper end of shaft 96 for rotation therewith and an endless chain 98 is driven thereby. The chain 98 passes over twelve individual agitator driving sprocket wheels 99 each fixed to the upper end of an individual vertical agitator operating shaft 100 disposed in each of the twelve reservoirs 24. As the reservoir unit 23 rotates during "Display" operation of the apparatus, the pinion 95 moves around the periphery of the stationary drive gear 94 and drives shaft 96 to which it is fixedly secured. This simultaneously drives all twelve individual agitator sprocket wheels 99 through the endless chain 98 and the driving sprocket wheel 97 fixed to the upper end of vertical shaft 96.

Figure 14:
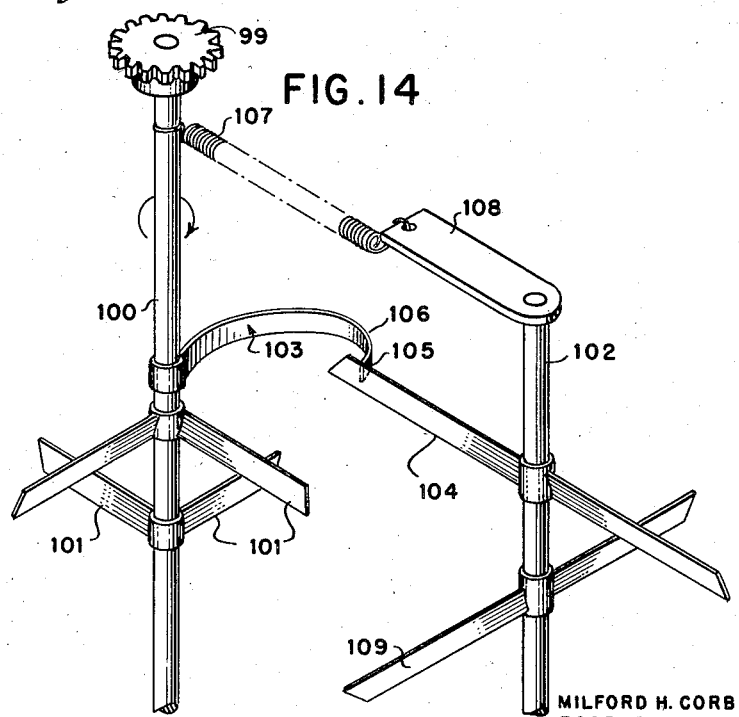
Figure 14 is an enlarged perspective view illustrating a modified form of agitating device.

According to one form of the invention, each individual vertical agitator shaft 10 is provided with an impeller comprising a plurality of radially extending paddle arms 101 (Fig. 14) formed of strip material inclined or pitched at an angle to provide vertical movement of the liquid by propeller action. To increase the effectiveness of agitation, an auxiliary oscillatory agitator shaft 102 is provided which is spaced from and parallel to the vertical shaft 100. A hook shaped cam arm 103 is fixed to vertical shaft 100 and engages a straight cam arm 104 carried by oscillatory shaft 102 during a portion of each revolution of vertical shaft 100.

The configuration of hook shaped cam arm 103 is such that the end 105 of the hook first engages straight cam arm 104, whereafter, the rounded outer surface 106 continues to displace straight cam arm 104 so that a total angular displacement of about 90° is obtained. This angular displacement is against the yielding action of a helical tension spring 107 having one end connected to the free end of an arm 108 fixed to the upper end of oscillatory shaft 102. The other end of tension spring 107 loosely encircles the vertical shaft 100 near its upper end. As hook shaped cam arm 103 continues to rotate, it disengages straight cam arm 104 and tension spring 107 acting on arm 108 then rotates oscillatory shaft 102 back to its starting position with straight cam arm 104 positioned for reengagement with hook shaped cam arm 103. Auxiliary paddle arms 109 fixed to oscillatory shaft 102 agitate the liquid in the reservoir 24 in a zone adjacent to the zone where the paddle arms 101 are revolving. This action increase the effectiveness of agitation of the liquid.

Figure 12:
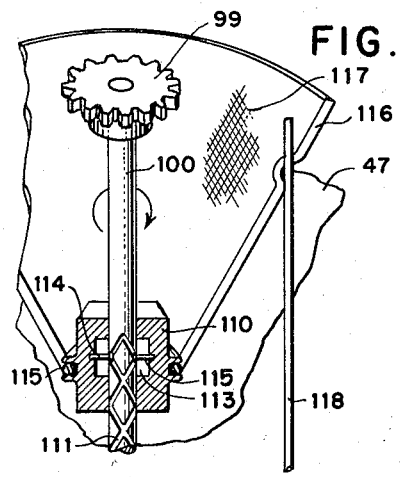
Figure 12 is an enlarged fragmentary perspective view of a vertically reciprocating agitating device for use in an individual reservoir.
Figure 13:
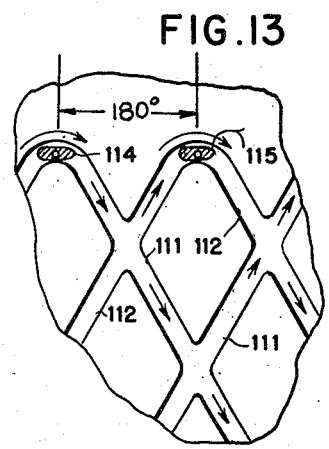
Figure 13 is an enlarged fragmentary view showing a development of helical grooves formed in the vertical shaft of the agitating device of Fig. 12.

According to another form of the invention, a vertically reciprocating nut 110 is mounted on vertical shaft 100. Two continuous helical grooves 111 and 112 are formed on shaft 100, the groove 111 being on the diametrically opposite side of shaft 100 with respect to the other groove 112 at every longitudinal portion of the grooved section of the shaft. As shown in the development in Fig. 13, each groove is endless and curves around at the end of the threaded section reversing its slope so that a follower traveling along the groove will turn around and reverse its direction of axial travel along shaft 100. Nut 110 has two diametrically opposed shallow cylindrical recesses 113 formed therein in proximity to vertical shaft 100. Followers 114 and 115 are freely revolubly mounted in recesses 113 and project radially inwardly to engage grooves 111 and 112, respectively. The groove engaging portions of followers 114 and 115 have rounded ends and are of sufficient length to be guided in a positive manner past intersections of the grooves 111 and 112. In this manner, while vertical shaft 100 rotates continuously in the direction indicated by the arrow shown in Fig. 12, nut 110 travels up and down in a reciprocatory manner along the helically grooved portion of the shaft.

A supporting frame 116 is fixed to nut 110 and carries a web member 117 formed of wire mesh screening, for example. Web member 117 covers substantially the entire transverse cross sectional area of the individual reservoir 24 in which it is vertically movably disposed. Conveniently, vertical guide rods 118 may be provided to prevent rotation of supporting frame 116 and to prevent frame 116 from rubbing against the sides of the reservoir. In its uppermost position, web member 117 rises above the upper surface 47 of the liquid 46 and as it travels downwardly it breaks up any film which might otherwise tend to form on the upper surface 47. In its lowermost position, web member 117 is near the bottom of the reservoir 24. Since the web member 117 acts on substantially the entire volume of the liquid, with this form of the invention, no auxiliary agitating means are required.

It will thus be seen that the various agitating devices described above will assure that the effects of sedimentation will be prevented and that the liquid to be dispensed will have been stirred into a state of homogeneity before any dispensing operation is commenced. In this manner consistently accurate results will be obtained for successive dispensing operations because of the homogeneity of the liquid which is dispensed.

Referring now, to the electrical circuit diagram of Fig. 16, a pair of conductors 120 and 121 are adapted to be energized from a suitable source of commercial alternating current. Conductor 120 is connected to a two-pole three-position power switch designated generally as 122. Conductor 121 is shown symbolically as being grounded for simplicity of illustration. The three positions of power switch 122 are designated "off," "display" and "dispense." In the "off" position of the switch, both pole 123 and 124 are open.

With power switch 122 in its "display" position, pole 123 energizes a half-wave rectifier 125 and pole 124 is open. A filter capacitor 126 is connected between the output side of rectifier 125 and ground, the filtered output of rectifier 125 being symbolically indicated as a grounded battery identified by the letter "M." Rectifier 125 continuously energizes the shunt field winding 127 of reservoir unit drive motor 55. The armature 128 of drive motor 55 is energized through the normally closed contacts 129—130 of a motor control relay designated generally as 131. With power switch 122 in its "display" position, drive motor 55 continuously rotates reservoir unit 23, the remainder of the dispensing apparatus being deenergized. In the course of this rotation, the various liquids in the twelve reservoirs 24 are continuously recirculated and agitated as described above.

With power switch 122 in its "dispense" position, pump motor 50 is energized and pump drive gear 28 drives the twelve pinions 29 to operate all of the pumps 31 at relatively high speed. Reservoir unit drive motor 55 remains in operation under control of relay 131.

In its "dispense" position, power switch 122 also energizes a half-wave rectifier 132 which supplies direct current for the energization of relays and other electromagnetic devices of the dispensing apparatus. A filter capacitor 133 is connected between the output side of rectifier 132 and ground. The filtered output of rectifier 132 is connected upon closure of normally open contacts 134 and 135 of a dispensing control relay 136 to energize the dispensing control circuits of the apparatus. For simplicity of illustration, this connection has been indicated diagrammatically as a grounded battery not otherwise identified.

Dispensing control relay 136 is also provided with a pair of normally closed contacts 137—138 which energize an audible signal 139 in series with a cam actuated switch 140 to provide an intermittent audible signal while pump motor 50 is in operation and the dispensing control circuits are deenergized. The switch 140 is actuated by a cam shoe 141 (Fig. 15) mounted on the sprocket wheel 52 driven by the pump motor 50. The purpose of the audible signal 139 is to direct the attention of the attendant to the fact that the pumps 31 are unnecessarily operating at high speed, particularly after dispensing has been completed.

Dispensing control relay 136 is of the mechanically held type, being provided with two windings 142 and 143. Energization of operating winding 142, even momentarily, attracts armature 144 allowing the other armature 145 to drop down thereby locking armature 144 in its attracted position. Armature 144 remains in its attracted position after operating winding 142 is deenergized. Attraction of armature 144 closes the normally open contacts 134 and 135 and opens the normally closed contacts 137—138, thereby energizing the dispensing control circuits and silencing the audible signal 139. Momentary energization of release winding 143 raises armature 145 unlocking armature 144 and allowing it to return to its unattracted normal position.

The dispensing control circuits comprise three reservoir selecting switches or color switches 146, 147 and 148 which may be individually manipulated for color preselection by means of control dials 149, 150 and 151, respectively, disposed on the front of a control panel 152 (Fig. 2). Each of the reservoir selecting switches 146, 147 and 148 is actually a single-pole twelve-position switch, one position being provided for each reservoir 24 of the reservoir unit 23. In Fig. 16, six of the twelve switch positions have been omitted for simplicity of illustration.

The dispensing action takes place in three sequences which permit the dispensing of three different preselected liquids from any three of the twelve reservoirs 24, the quantity of each liquid also being preselected for each dispensing sequence by means of three volumetric control switches 153, 154 and 155 (Fig. 16). The volumetric control switches 153 and 154 and 155 may be manipulated for preselection of the amount of liquid to be dispensed in each of the three sequences by means of control dials 156, 157 and 158, respectively, on the front of control panel 152 (Fig. 2).

The twelve reservoir positioning switches 72 and the upright switch actuating portion 71 of L-shaped bracket 70 have been diagrammatically represented in Fig. 16 as a single-pole six-position switch operated by the reservoir unit drive motor 55 and designated generally as 159, six of the switches having been omitted for simplicity of illustration. In addition, a common conductor which extends to one terminal of each of the positioning switches 72 has been diagrammatically shown as a grounded switch arm 160 which moves around in a clockwise direction consecutively from one to another of six switchpoints 161 individually identified as A to F. These six switchpoints 161 are multipled to six similarly identified switchpoints A to F of the reservoir selecting switches 146, 147 and 148 through cabling 162.

To control the quantity of liquid dispensed during each of the three sequences, a stepping type rotary selector switch designated generally as 163 is shown provided with a double ended wiper brush 164 which moves successively from one terminal to another of a semi-circular bank of terminals 165, certain of these terminals being identified by numerals 1 to 8. In a commercial embodiment of the invention, four banks having twenty-five effective terminals in each bank, together with switching means for successively using each of the four banks, results in an effective total of one hundred switch terminals. For simplicity of illustration, however, only twelve bank terminals have been shown in the drawing, since the number of terminals may be modified to suit actual requirements in practice. Switching devices of this character are well known in the automatic telephone art, and any desired type may be used.

The stepping switch 163 comprises a stepping magnet 166 associated with conventional ratchet mechanism (not shown) which advances the brush 164 to the next terminal of bank 165 each time that the stepping magnet 166 is deenergized. Stepping switch 163 also includes self-interrupting homing contacts 167 and off-normal contacts 168 which are conventional in stepping switches of this type. The self-interrupting homing contacts 167 and the off-normal contacts 168 are used to buzz the stepping switch 163 around to a predetermined initial starting position, or normal position, after it has received a predetermined number of stepping impulses from the counting circuit commutator 74.

The stepping switch bank terminals identified by numerals 1 to 8 are multipled through cabling 169 to the corresponding numbered terminals 1 to 8 of the three volumetric control switches 153, 154 and 155.

The cabling 169 connects the contact points of the volumetric control switches 153, 154 and 155 in multiple to certain terminals of stepping switch bank 165 which are non-uniformly spaced. For larger volumes, the number of bank terminals between conductors extending to adjacent volumetric control switch terminal becomes greater. This non-uniform spacing permits increments in volume between successive steps of the volumetric control switches to be made more uniform from a percentage standpoint.

A first set of sequence transfer relays 170 and 171 is provided which are actuated after completion of the first dispensing sequence as determined by the settings of reservoir selecting switch 146 and volumetric control switch 153. After the first set of sequence transfer relays has been operated, the reservoir selecting switch 147 and the volumetric control switch 154 become effective, these switches being connected for use during the second dispensing sequence.

Similarly, a second set of sequence transfer relays 172 and 173 is provided for connecting the reservoir selecting and volumetric control switches 148 and 155, respectively, for operation during the third sequence after the second sequence has been completed.

Although three dispensing sequences have been shown by way of illustration, the number of sequences will be determined by the maximum number of different liquids to be included in any single combination of liquids to be dispensed by the apparatus. Thus, if various quantities of five different liquids are required in certain instances, then the number of sequences must be increased to five. This involves merely the addition of a reservoir selecting switch, a volumetric control switch, and a set of sequence transfer relays for each additional sequence, the additional circuits being connected in the same manner as the three circuits shown. Obviously, the maximum useful number of sequences will be equal to the number of individual reservoirs 24 included in the reservoir unit 23 which, in the illustrative embodiment shown, would be a maximum of twelve. This would permit the dispensing of a combination of liquids including a liquid from each of the twelve reservoirs. In a pigment dispensing machine for obtaining paints of different colors, it has been found possible in practice to obtain all of the commercially necessary chromaticities using a total of twelve reservoirs and three color sequences. In unusual cases, the dispensing apparatus shown in the drawing may be operated repeatedly with different reservoir selecting switch settings to dispense more than three different liquids into the same container by allowing the container to remain in place during a plurality of successive operations of the dispensing apparatus.

In operation, the power switch 122 is turned to its "dispense" position so that the pumps 31 will operate at high speed for a preliminary interval assuring a thorough recirculation of all of the liquids before any one of them is dispensed. The reservoir unit drive motor 55 is in operation and agitating means in each of the reservoirs supplements the high speed recirculatory action of the pumps 31. During this interval, the desired settings for the reservoir selecting switches 146, 147 and 148 are established by means of control panel dials 149, 150 and 151, respectively. Similarly, the desired volumes of the several selected liquids are individually established by manipulation of control panel dials 156, 157 and 158 which turn the volumetric control switches 153, 154 and 155, respectively, to corresponding positions. These dial settings will ordinarily be obtained from a chart. In the case of a pigment dispensing machine this would be a color chart or catalog.

After the desired switch settings have been established, a container 42 is placed in dispensing position. As illustrated in Fig. 1, this is a pint container which engages only the actuating arm 93 of the lowermost container switch 90. This establishes a circuit from ground through contacts 174—174a of container switch 90, closed by container 42, to lower contact 175 of a "start" button 176. Start button 176 is then pressed and a circuit is completed through upper "start" button contact 177 to energize the operating winding 142 of dispensing control relay 136. This causes closure of dispensing control relay contacts 134—135 energizing the dispensing control circuits. In the course of its rotation, the upright arm 71 on large sprocket wheel 59 will engage the actuating stud 73 of the particular reservoir positioning switch 72 corresponding to the setting of reservoir selecting switch 146 for the first sequence. Referring to Fig. 16, this corresponds to engagement of the grounded contact arm 160 with the C switchpoint 161 which has been shown selected by the reservoir selecting switch 146 for the first sequence.

When the arm 160 reaches the C switchpoint 161, a circuit is established from ground through cabling 162 and arm 178 of reservoir selecting switch 146 and the normally closed contacts 179—180 of sequence transfer relay 170 to the operating winding 181 of drive motor control relay 131. This operates drive motor control relay 131, breaking the energizing circuit of drive motor armature 128 through contact 129 and grounding the armature 128 by closure of contacts 130 and 182. This short circuits armature 128 while the shunt field 127 remains energized, thus creating a dynamic braking effect which stops drive motor 55 abruptly, thereby keeping arm 160 in contact with the C switchpoint 161 of the reservoir positioning switch 159.

The operating winding 183 of sequence transfer relay 170 is connected to a hunting circuit which extends through its closed contacts 206—207, a conductor 183a and switch arm 184 of the volumetric control switch 153 for the first sequence to terminal 2 of this switch which has been arbitrarily selected for purposes of illustration. This hunting circuit further extends through cabling 169 to terminal 2 of the bank 165 of stepping switch 163, to be completed when the grounded wiper brush 164 reaches the bank terminal 2.

When drive motor control relay 131 was energized, in addition to applying dynamic braking to drive motor 55, it closed its normally open contacts 185 and 186. Closure of contacts 185—186 completed a charging circuit for a delay capacitor 187 through a resistor 188. After capacitor 187 has become charged to the operating potential of a preliminary synchronizing relay 189, the current through its operating winding 190 has become sufficient to cause closure of its normally open contacts 191 and 192. Closure of contacts 191—192 applies ground from the grounded reservoir positioning switch arm 160, the reservoir selecting switch 146 and closed relay contacts 179—180 via a conductor 193 and commutator synchronizing circuit brush 79 to the outer contact ring 75 of commutator 74. The delay provided by the charging interval of capacitor 187 is sufficient to allow the action of shock absorber 60 to become completed and to assure that the preselected container 24 is properly positioned to dispense liquid from its associated discharge pipe 41 into the container 42. Operation of preliminary synchronizing relay 189 and closure of its normally open contacts 191—192 prepares a synchronizing circuit through brushes 78 and 79. As soon as the leading edge of synchronizing contact projection 76 engages the brush 78, valve control relay 194 is energized and closes its normally open contacts 195—196, completing a locking circuit to ground for its operating winding 197 through its own closed contacts 195—196, arm 178 of reservoir selecting switch 146, cabling 162 and grounded reservoir positioning switch arm 160. The operating winding 198 of master dispensing valve control solenoid 40 is energized in parallel with the operating winding 197 of valve control relay 194, thereby causing the free end 37 of master valve actuating lever 38 to press against the dispensing valve actuating member 36 of the dispensing valve 33 associated with the preselected reservoir 24 which is then in dispensing position. The dispensing of the desired liquid thus commences substantially at the instant when the leading edge of the commutator synchronizing projection 76 engages synchronizing circuit brush 78, allowing for the inherent delay involved in the operating time of master dispensing valve control solenoid 40.

Engagement of the leading edge of synchronizing projection 76 by synchronizing circuit brush 78 also applies ground to the operating winding 199 of a stepping switch control relay 200 causing its movable contact 201 to disengage its fixed normally closed contact 202 and engage its fixed normally open contact 203. This applies ground through the normally closed contacts 204—205 of quart container switch 89 to the stepping magnet 166 of stepping switch 163, this circuit including the common counting circuit brush 80, the longest inner contact ring projection 85, and the pints counting circuit brush 81. This energizes stepping magnet 166, preparing the stepping switch 163 to advance by one step when the trailing edge of the longest inner contact ring projection 85 disengages the pints counting circuit brush 81. When this occurs, brush 164 of stepping switch 163, which was previously reset as described above, advances to the first bank terminal past the normal position of the stepping switch 163 shown in the drawing. The pints counting circuit brush 81 next engages a pints counting short projection 87 of commutator 74 and when this projection is disengaged, stepping switch wiper brush 164 advances to the second bank terminal identified by the numeral 1 and the next projection of intermediate length 86 advances the wiper brush 164 to the next bank terminal identified by the numeral 2. Bank terminal 2 has been illustratively shown selected by arm 184 of volumetric control switch 153 for the first sequence and a ground circuit is established from this bank terminal through cabling 169 and point 2 of volumetric control switch 153 to normally closed lower contacts 206—207 of sequence transfer relay 170 completing the hunting circuit referred to above. Ground is applied by movable contact 208 of the lower make-before-break contact combination of sequence transfer relay 170 directly to the operating winding 183 of this relay, thereby locking in sequence transfer relay 170 under control of the presently closed contacts 134—135 of dispensing control relay 136. The upper movable contact 209 of sequence transfer relay 170 disconnects the operating winding 181 of reservoir unit drive motor control relay 131 from reservoir selecting switch 146 for the first sequence and prepares this operating winding for energization from reservoir selecting switch 147 for the second sequence through the presently open contacts 210 and 211 of auxiliary sequence transfer relay 171. Drive motor control relay 131 thereupon releases and reenergizes armature 128 of reservoir unit drive motor 55 by closure of its normally closed contacts 129—130.

Deenergization of the operating winding 181 of drive motor control relay 131 is simultaneously accompanied by deenergization of the winding 198 of master dispensing valve solenoid 40 which cuts off the further dispensing of liquid from the particular reservoir 24 selected for the first sequence. Valve control relay 194 is also simultaneously released and unlocked.

Arm 160 of reservoir positioning switch 159 resumes rotation hunting for the particular switchpoint 161 which has been preselected at the second sequence reservoir selecting switch 147. Release of drive motor control relay 131 also causes it to open its contacts 185 and 186, thereby releasing preliminary synchronizing relay 194.

Deenergization of operating winding 181 of drive motor control relay 131 is also accompanied by a deenergization of operating winding 199 of stepping switch control relay 200. Since stepping switch 163 has advanced from its normal position, its off-normal contacts 168 are closed. Release of stepping switch control relay 200 applies ground through its normally closed contacts 201—202 and through off-normal contacts 168 and self-interrupting homing contacts 167 of stepping switch 163 to its stepping magnet 166. Stepping switch 163 thereupon buzzes around at high speed until its off-normal contacts 168 open upon arrival of wiper brush 164 at its normal or starting position as shown in the drawing. This resetting action is completed before the relatively slow moving arm 160 of reservoir positioning switch 159 can advance to the next or D switchpoint 161.

Auxiliary sequence transfer relay 171 is slow operating, being energized from presently closed locking contacts 206—208 of sequence transfer relay 170 through a delay circuit comprising a charging resistor 212 and a delay capacitor 213. This delay is sufficient to allow all previously actuated relay circuits to become restored to normal and become ready for the second dispensing sequence and also to allow grounded arm 160 of reservoir positioning switch 159 to advance sufficiently to disengage the C switchpoint 161 where it stopped during the first sequence. Any other conventional type of slow operating relay may be used as an auxiliary transfer relay, if desired.

Closure of contacts 210—211 of auxiliary transfer relay 171 completes a reservoir positioning circuit for the second sequence through upper normally closed contacts 214—215 of sequence transfer relay 172 of the second set of transfer relays from the arm 216 of second sequence reservoir selecting switch 147 and through closed contacts 209—180 of locked in transfer relay 170 to the operating winding 181 of drive motor control relay 131.

When the rotating arm 160 of reservoir positioning switch 159 touches the particular switchpoint 161, illustratively shown as the B switchpoint, which has been preselected at reservoir selecting switch 147 for the second sequence, drive motor control relay 131 operates and abruptly stops the reservoir unit 23. Preliminary synchronizing relay 189 operates after a brief delay and stepping switch 163 begins to advance immediately after the synchronizing circuit through brushes 78 and 79 has been completed, the first step taking place when the brush 81 disengages the trailing edge of the longest commutator projection 85, as described above.

When wiper brush 164 of stepping switch 163 reaches the bank terminal identified by the numeral 3, which has been shown preselected by volumetric control switch 154 for the second sequence, transfer relay 172 operates through a circuit extending from its operating winding 217 and its lower normally closed contacts 218—219, the closed normally open lower contacts 220—221 of locked in transfer relay 170, the closed contacts 222—223 of auxiliary transfer relay 171 which is held operated by transfer relay 170, the switch arm 224 of second sequence volumetric control switch 154 and through cabling 169 to the stepping switch bank terminal identified by numeral 3 to grounded wiper brush 164.

This operates sequence transfer relay 172 whose normally closed contacts 214—215 open, thereby releasing drive motor control relay 131 and deenergizing valve solenoid 40. Dispensing of liquid stops and reservoir unit drive motor 55 resumes operation. Stepping switch 163 resets itself to normal as described above, in preparation for the third sequence.

The third sequence takes place with the both sets of sequence transfer relays 170 to 173 operated, the operation of the second set of transfer relays being substantially identical with that of the first set.

At the end of the third sequence, when the wiper brush 164 of stepping switch 163 reaches the preselected terminal of bank 165, ground is applied through cabling 169, switch arm 225 of volumetric control switch 155 for the third sequence, closed contacts 226—227 of auxiliary transfer relay 173 of the second set, closed contacts 228—229 of sequence transfer relay 172 of the second set, and a conductor 230 to energize release winding 143 of dispensing control relay 136. This draws armature 145 upwardly and allows contacts 134 and 135 to open, thereby deenergizing the dispensing circuits including dispensing valve solenoid 40. To provide for resetting of stepping switch 163 after the dispensing control circuits are deenergized by the opening of contacts 134—135 of dispensing control relay 136, one terminal of the stepping magnet 166 is connected directly to the output of rectifier 132. In this manner, when stepping switch control relay 200 releases, ground will be connected through the off-normal contacts 168 to the self-interrupting homing contacts 167, and with all other dispensing control circuits deenergized, stepping switch 163 will buzz around to its normal position. When stepping switch 167 reaches its normal position, its off-normal contacts 168 open and the stepping switch is ready for the next dispensing operation of the apparatus.

Each of the volumetric control switches, 153, 154 and 155 is shown provided with a "zero" position. With any volumetric control switch in the "zero" position, its associated dispensing sequence is omitted. In the case of the first sequence, for example, the volumetric control switch 153 has its switch arm 184 establishing a direct ground connection from the C terminal of reservoir selecting switch 146 back to the lower normally closed contact 207 of sequence transfer relay 170 where it immediately causes this relay to lock in without waiting for operation of the stepping switch 163. Control of dispensing valve 40 thus bypasses the first sequence and is substantially instantaneously transferred to the second sequence.

Similarly, if the volumetric control switch 154 of the second sequence is set in its "zero" position, grounding of its switch arm 216 by revolving contact arm 160 of reservoir positioning switch 159, immediately operates sequence transfer relay 172 of the second set through the previously closed contacts 220—221 and 222—223 of the transfer relays 170 and 172, respectively, of the first transfer relay set. If volumetric control switch 155 for the third sequence should be set at its "zero" position, then dispensing control relay 136 is immediately restored to normal by energization of its release winding 143, thus deenergizing the dispensing control circuits as hereinabove described, relays 172 and 173 having been previously operated either by completion or by-passing of the second sequence.

The three container switches for pints, quarts, and gallons, designated 90, 89 and 88, respectively, are arranged to form an interlock circuit to prevent any dispensing action whatsoever unless at least a one pint container is positioned to receive the dispensed liquid.

Referring more particularly to the pints container switch 90, when no container is positioned to receive liquid dispensed by the apparatus, the circuit through "start" button contacts 175, 176 to the operating winding 142 of dispensing control relay 136 is open at contacts 174 and 174a of the pints container switch 90, so that pressing "start" button 177 will be ineffective. If the container 42 should be removed during the operation of the dispensing apparatus, the release winding 143 of dispensing control relay 136 will be directly energized through contacts 174a, 174b of pints container switch 90, thereby unlocking this relay and terminating all further dispensing action of the apparatus. This also starts operation of audible signal 139, as described above.

When a one quart container is used, container switches 89 and 90 are actuated and the circuit to the pints counting circuit contact brush 81 is opened by the opening of normally closed contacts 204 and 205 of container switch 89. This renders brush 81 ineffective and thus prevents any response to the four short projections 87 of inner commutator ring 84. As a result, stepping switch 163 advances only every 90° of commutator rotation, instead of every 45° and the amount of pumping action of the pumps 31 is doubled for each step of stepping switch 163. This automatically doubles the amount of liquid dispensed into a quart container as compared to the amount dispensed into a pint container, thus making it possible to use the same volumetric control switch settings without regard to container capacity.

In the case of a one gallon container, all three container switches 88, 89 and 90 are actuated. The transfer contact 231 of container switch 88 disengages normally closed contact 232 and makes contact with normally open contact 233. This breaks the circuit of quarts commutator brush 82 which engages the commutator projections 86 of intermediate length and closes the circuit of gallons commutator brush 83 which engages only the longest commutator projection 85. Thus, with a one gallon container, stepping switch 163 advances only once for each complete revolution of commutator 74, thereby dispensing eight times the volume for each step, as compared to the volume dispensed in the case of a one pint container, and four times the volume for each step, as compared to a one quart container.

Figure 5:
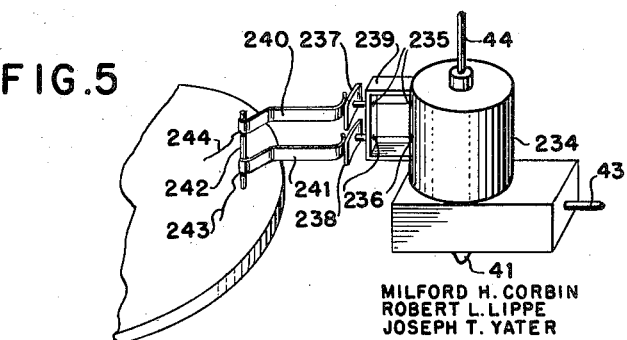
Figure 5 is a fragmentary perspective view illustrating connections to an individual electrically controlled dispensing valve.

Figure 5, illustrates a modified form of dispensing valve control. An individual solenoid valve 234 is provided for each of the twelve individual reservoirs 24. The discharge conduit 43, the inlet conduit 44, and discharge pipe 41 are arranged as described above for each of the twelve reservoirs. Flexible conductors 235 and 236 extend from the valve 234 to suitably insulated contact shoes 237 and 238, respectively, mounted on a supporting bracket 239. Resilient contact arms 240 and 241 are mounted on a fixed support 242. As the reservoir unit 23 rotates, successive pairs of contact shoes 237 and 238 associated with each of the twelve reservoirs 24 engage the fixed resilient contact arms 240 and 241. When the reservoir unit 23 stops in dispensing position, the arms 240 and 241 are in engagement with the contact shoes 237 and 238 of the preselected reservoir from which liquid is to be dispensed. Conductor 243 extends from resilient contact arm 241 to contact 196 of valve control relay 194 (Fig. 16) and conductor 244 extends from resilient contact arm 240 to rectifier 132 through the contacts 134 and 135 of dispensing control relay 136. The contact arms 240 and 241 are thus energized in the same manner as the operating winding 198 of master valve control solenoid 40, which is omitted. When conductors 235 and 236 are energized, circulating liquid is diverted by valve 234 from reservoir inlet conduit 44 to discharge pipe 41 from which it is dispensed into the container 42. The twelve electrically controlled valves 234 may be of conventional internal construction, and the particular form of construction has not been shown.

Figure 17 shows a modified form of the invention in which the time delay circuits have been omitted and in which the reservoir unit 23 stops only after the contacts of the desired reservoir positioning switch 72 have first closed and then opened. The sequence transfer relays are similarly arranged with respect to the stepping switch 163.

Figure 17 also provides means for starting the pump motor for high speed pump action at the time when a container is placed in dispensing position, a predetermined minimum time of high speed pump operation being required before dispensing can commence. This time is determined by a slow cooling thermal relay to avoid unnecessary delay when liquid is being dispensed to a series of containers in rapid succession. Unless dispensing commences within a predetermined maximum time limit, the high speed pump action is stopped in order to reduce wear on the pumps and pump drive mechanism.

Figure 17 is further arranged to operate the reservoir unit drive motor 55 periodically in order to keep the liquids in the reservoirs properly agitated, particularly when the dispensing apparatus would otherwise stand idle for long periods of time.

Referring to Fig. 17, the reservoir positioning switch 159 has been diagrammatically represented as in Fig. 16 by a grounded switch arm 160 which successively contacts the switchpoints 161. The switchpoints 161 are multipled through cabling 162 to the reservoir selecting switches 146, 147 and 148 for the first, second and third dispensing sequences, respectively.

Two sets of sequence transfer relays are provided. The first set comprises relays 250 and 251. The second set comprises relays 252 and 253. As in Fig. 16, operation of the first set of transfer relays 250 and 251 transfers control of the dispensing action from the switches of the first dispensing sequence to the switches of the second sequence. The first set of transfer relays 250 and 251 remains operated and subsequent operation of transfer relays 252 and 253 of the second set transfers control of the dispensing action from the switches of the second sequence to the switches of the third sequence.

The reservoir unit drive motor 55 is controlled by first and second motor control relays 254 and 255, respectively, together with a reset relay 256. When the grounded arm 160 of reservoir positioning switch 159 establishes contact with the particular switchpoint 161 selected by the effective one of the reservoir selecting switches 146, 147 or 148, relay 254 operates and connects armature 128 of drive motor 55 to a point of reduced voltage on a potentiometer consisting of resistors 257 and 258 connected in series across the output of rectifier 125. This series connection is effected through contacts 259—260 of first motor control relay which are closed by energization of its operating winding 261 and the normally closed contacts of second motor control relay 255. The operating winding 264 of second motor control relay is grounded at both ends. The lower end of winding 264 is grounded through normally closed contacts 265 and 266 of reset relay 256. The upper end of winding 264 is grounded through a circuit passing through contacts 267—268 of first motor control relay 254, normally closed contacts 269—270 of upper transfer relay 250 of the first set, switch arm 178 of reservoir selecting switch 146, cabling 162, and the selected switchpoint 161 to ground through the arm 160 of reservoir positioning switch 159.

Thus, so long as grounded arm 160 of reservoir positioning switch 159 remains in contact with the selected switchpoint 161, the second motor control relay 264 will be prevented from operating and drive motor 55 will operate at reduced speed, its armature being connected to a source of reduced voltage with full field excitation maintained. When grounded arm 160 of reservoir positioning switch 159 leaves the selected switchpoint 161, operating winding 264 of the second motor control relay 255 is energized in series with the operating winding 261 of the first motor control relay 254 through contacts 267—268 of first motor control relay 254. This operates the second motor control relay 255 causing closure of its contacts 263—271, thereby disconnecting the armature 128 of drive motor 55 from the resistors 257 and 258 and short circuiting the armature 128 by the application of ground thereto at contact 271 of second motor control relay 255. This abruptly stops drive motor 55 which was operating at reduced speed. The operation at reduced speed lessens the shock on the reservoir unit drive mechanism since the stopping takes place in two stages instead of in a single stage as in Fig. 16, dynamic braking action being utilized in each stage. Contacts 272 and 273 of second motor control relay 255 open, deenergizing resistor 257.

The operating characteristics of first motor control relay 254 must be such that it will operate when full voltage is applied to its operating winding 261 and will hold on reduced current when it is connected in series with the operating winding 264 of second motor control relay 255. The operating characteristics of second motor control relay 255 must be such that it will operate in series with the operating winding 261 of first motor control relay 254.

Resistors 257 and 258 are preferably proportioned to deliver at least full load current to armature 128 with the armature blocked, in order to assure ample torque when operating at reduced speed. The resistors 257 and 258 normally carry no current, being energized only during operation of drive motor 55 at reduced speed. They may therefore be suitable for intermittent duty, but must be arranged to avoid any fire hazard if continuously energized.

Drive motor 55 stops when reservoir unit 23 is in dispensing position with the particular reservoir selected by switch 146 for the first sequence positioned to deliver liquid to the container 42, this position being determined by opening the circuit including grounded arm 160 of reservoir positioning switch 159 and the selected switchpoint 161, accompanied by operation of second motor control relay 255, as described above. Operation of second motor control relay 255 applies ground through its contacts 274—275 to a conductor 276 which is connected to outer ring synchronizing circuit brush 79 of commutator 74.

As soon as the synchronizing contact projection 76 of commutator 74 engages synchronizing circuit brush 78, stepping switch control relay 277 operates, locking in by closure of its contacts 278—279.

At the same time that the operating winding 280 of stepping switch control relay 277 is energized, the operating winding 198 of master dispensing valve control solenoid 40 is energized so that the dispensing of liquid commences at this time.

Operation of stepping switch control relay 277 also causes it to break its normally closed contacts 281—282 and to close normally open contacts 281 and 283, applying ground to the wiper brush 164 of stepping switch 163 and to a particular one of the commutator brushes 81, 82 and 83 through the contacts of the container switches 88 and 89, depending upon the dimensions of the container 42. This closes a circuit through inner contact ring 84 and longest contact projection 85 to the common counting circuit brush 80, energizing stepping magnet 166 of stepping switch 163, so that stepping switch 163 advances from its normal to its zero position as soon as the trailing edge of longest commutator projection 85 simultaneously disengages the three brushes 81, 82 and 83.

Counting continues, as described above, until wiper brush 164 of stepping switch 163 reaches the particular terminal of bank 165 preselected by volumetric control switch 153 for the first sequence. This energizes operating winding 284 of reset relay 256 opening its normally closed contacts 265 and 266 which releases both motor control relays 254 and 255. Reset relay 256 also opens its normally closed contacts 285 and 286, immediately releasing dispensing valve solenoid 40 by deenergizing its operating winding 198.

Second motor control relay 255, when released, opens its formerly closed contacts 274—275 removing ground from conductor 276 and thereby unlocking stepping switch control relay 277. When stepping switch control relay 277 releases, ground is transferred from wiper brush 164 of stepping switch 163 and counting circuit commutator brushes 81, 82 and 83 to off-normal contacts 168 and self interrupting homing contacts 167 of stepping switch 163, thereby causing the stepping switch 163 to buzz around to its normal position where the off-normal contacts 168 are open.

When the stepping switch 163 arrived at its preselected terminal of bank 165, ground was applied from wiper brush 164 through cabling 169 and switch arm 184 of volumetric control switch 153 to winding 284 of reset relay 256 through the normally closed contacts 287 and 288 of lower transfer relay 251 of the first set. This ground was also applied through additional normally closed contacts 289—290 of lower transfer relay 251 to the operating winding 291 of upper transfer relay 250, operating this relay. Operation of upper transfer relay 250 breaks its normally closed contacts 269—270 and closes the normally open contacts 269 and 292, thereby transferring control of the operating winding 261 of first motor control relay 254 from the first sequence reservoir selecting switch 146 to the second sequence reservoir selecting switch 147 through the normally closed contacts 293—294 of upper transfer relay 252 of the second set. The grounded arm 160 of reservoir positioning switch 159 is open, since drive motor 55 stopped after disengagement with the selected one of the switchpoints 161, all twelve conductors of cabling 162 thus being open at the reservoir positioning switch 159.

Operation of upper transfer relay 250 of the first set causes it to close its normally open contacts 295 and 296 preparing an energizing circuit to the operating winding 297 of its associated lower transfer relay 251. Under these conditions, operating winding 297 is grounded at both ends and lower transfer relay 251 remains unoperated, ground from wiper brush 164 of stepping switch 163 still being applied through contacts 289—290 of lower transfer relay 251 and contacts 295—296 of upper transfer relay 250. As soon as stepping switch control relay 277 releases and before stepping switch 163 commences to buzz around to its normal position, ground is removed from arm 184 of volumetric control switch 153 by the opening of contacts 281 and 283 of relay 277 and lower transfer relay 251 immediately operates, its operating winding 297 being energized in series with the operating winding 291 of upper transfer relay 250.

Operation of lower transfer relay 251 opens normally closed contacts 287—288 and closes normally open contacts 287 and 298, thereby transferring control of reset relay 256 from the first sequence volumetric control switch 153 to the second sequence volumetric control switch 154 through normally closed contacts 299—300 of the lower transfer relay 253 of the second set. Normally closed contacts 289—290 also open, completely disconnecting arm 184 of the first sequence volumetric control switch 153 and preventing any further effect from stepping switch 163 on the first set of transfer relays 250 and 251.

The positioning of the selected reservoir for the second sequence proceeds as described for the first sequence.

Dispensing is similarly terminated by operation of reset relay 256 when the stepping switch 163 finds the terminal of bank 165 preselected by second sequence volumetric control switch 154. Upper transfer relay operating winding 301 is energized when the wiper brush 164 arrives at the preselected bank terminal and operating winding 302 of the lower transfer relay 253 is energized in series with winding 301 of the upper relay as soon as stepping switch control relay 277 is unlocked and just before the wiper brush 164 leaves the selected terminal. The two transfer relays 252 and 253 of the second set are then both operated. Movable contact 299 of lower transfer relay 253 disengages normally closed contact 300 and engages two separate normally open contacts 303 and 304.

Dispensing proceeds as before, and when the stepping switch 163 applies ground to the preselected terminal of bank 165 as determined by the third sequence volumetric control switch 155, reset relay 256 is operated. In the third sequence, however, the release winding 143 of dispensing control relay is also energized, thereby causing it to open its contacts 134 and 135 and deenergize the dispensing circuits so that the transfer relays 250 to 253 and motor control relays 254 and 255 are all released. This prepares the dispensing apparatus for the next cycle of operation.

In Fig. 17, when a container 42 is positioned to actuate the lowermost container switch 90, it closes its contacts 173 and 174 energizing the operating winding 305 of a power control relay 306 from power conductor 120, the circuit being completed through the normally closed contacts 307—308 of an auxiliary power control relay 309. Power control relay 306 closes its normally open contacts 310 and 311 energizing rectifier 125 for operation of drive motor 55. Power control relay 306 also closes its normally open contacts 312 and 313 to energize pump motor 50 and drive the pumps 31 at high speed. The rectifier 132 is also energized, and its output has been indicated as a grounded battery identified by the letter "P."

It is desirable that the pumps 31 operate at high speed for a time interval sufficient to assure a rapid fluid flow through the reservoir discharge and inlet conduits 43 and 44, respectively, as well as in the recirculation portions of the dispensing valves 33. The time of high speed pre-dispensing pump operation should be longer if the apparatus has been standing idle for an extended period. If the dispensing apparatus is in substantially continuous use, no pre-dispensing interval of pump operation is required. Timing devices having such characteristics are well known in the art, and any suitable type may be used. A thermal relay 314 has been shown by way of illustration. A thermal type of relay offers the additional advantage that in cold weather, when the viscosity of the liquids in the reservoir unit 23 is generally higher, the time required to operate thermal relay 314 will be longer and thus the pre-dispensing interval of pump operation will be increased. In this manner, the several liquids will be more thoroughly recirculated prior to dispensing in accordance with their increased viscosities.

Thermal relay 314 is provided with a heater winding 315 connected in multiple with pump motor 50 and which is suited for continuous energization. A pair of normally open contacts 317 and 318 are included in thermal relay 314. Contact 318 is carried by a bimetallic arm 319 which is heated by heater 315, contact 318 moving toward the left with increasing temperature. Sufficient thermal lag is provided so that bimetallic arm 319 cools relatively slowly after heater 315 is deenergized.

After the reservoir selecting switches 146 to 148 and the volumetric control switches 153 to 155 have been set in their desired positions, start button 177 is pressed, closing its contacts 175 and 176. Ground is applied to the operating winding 320 of a locking relay 321 and the locking relay 321 operates, closing its contacts 322 and 323 and locking in on ground supplied from normally closed contacts 324—325 of dispensing control relay 136. As soon as thermal relay contacts 317 and 318 close, or if they are already closed, ground is applied to operating winding 142 of dispensing control relay 136 and its contacts 134 and 135 close, energizing the dispensing circuits so that dispensing action will commence. Normally closed contacts 324 and 325 open, unlocking the locking relay 321.

In order to prevent the pump motor 50 from operating indefinitely if "start" button 176 is not pressed, a recycling timer 326 is provided which closes its contacts 327 and 328 after its terminals 329 and 330 have been energized for a certain predetermined time interval. Momentary deenergization of timer terminals 329 and 330 resets the timer and the full time interval must elapse after reenergization of terminals 329 and 330 before contacts 327 and 328 will close. If dispensing is started by pressing "start" button 176 before the time interval of timer 326 has elapsed, then contacts 137 and 138 of dispensing control relay 136 open the circuit to timer terminals 329 and 330 thereby preventing closure of its contacts 327 and 328. If, however, "start" button 176 is not pressed before the time interval of timer 326 expires, then contacts 327—328 close, energizing the operating winding 331 of an operation terminating relay 332.

Operation terminating relay 332 closes its normally open contacts 333 and 334 energizing the operating winding 335 of auxiliary power control relay 309. Auxiliary power control relay 309 operates, breaking its normally closed contacts 307—308 and closing normally open contacts 307 and 336 in make-before-break sequence. Opening of contacts 307 and 308 breaks the circuit of operating winding 305 of power relay 306. Power relay 306 releases and the motors 50 and 55 and the rectifier 132 are deenergized. Closure of contacts 307 and 336 of auxiliary power relay 306 locks this relay in under control of closed contacts 174—174a of container switch 90 as long as a container remains in dispensing position. A "finish" pilot light 337 is lighted as long as the container 42 is permitted to remain in dispensing position.

Operation terminating relay 332 is also operated when dispensing is completed, its operating winding 331 being connected in parallel with the release winding 143 of dispensing control relay 136.

When it is desired to dispense a combination of less than three liquids, one or more of the volumetric control switches 153 to 155 is set at its "zero" position. A conductor 338 is multipled to the "zero" terminal of the three volumetric control switches. When the grounded arm 160 of reservoir positioning switch 159 touches the selected switchpoint 161 for the sequence whose volumetric control switch has been set at "zero," a circuit is established directly to the operating winding 291 of upper transfer relay 250, in the case of the first sequence. This immediately breaks its contacts 269 and 270, opening the circuit to the operating winding 261 of first motor control relay 254. In order to insure proper operation, contacts 269 and 270 of upper transfer relay 250 must open before the first motor control relay 254 can close its normally open contacts 267 and 268, otherwise both motor control relays 254 and 255 would lock in and stop drive motor 55 with an undesired reservoir in dispensing position. Additionally, normally open contacts 295 and 296 of upper transfer relay 250 must close before its normally closed contacts 269—270 open, in order to lock in both upper and lower transfer relays 250 and 251 substantially instantaneously.

The operation is similar when the volumetric control switch 154 of the second sequence is set at "zero," the second set of transfer relays locking in substantially instantaneously and transferring control of the dispensing circuits to the reservoir selecting switch 148 and volumetric control switch 155 of the third sequence.

In order to assure proper agitation of the liquids when the dispensing apparatus is left idle for long periods, such as over a holiday or a week-end, a small timer motor 339 is provided which is continuously energized and drives an adjustable cam 340. Cam 340 periodically closes a pair of normally open contacts 341 and 342 to energize rectifier 125 and operate drive motor 55. This operates the pumps 31 at slow speed for recirculating the liquids and also operates the agitating apparatus in each tank, as described above. It is thus unnecessary to operate drive motor 55 continuously in order to keep the liquids properly agitated. If continuous operation of drive motor 55 is desired for display purposes, switch 343 may be operated to short circuit the cam operated contacts 341 and 342.

We have shown what we believe to be the best embodiments of our invention. We do not wish, however, to be confined to the embodiments shown, but what we wish to secure by Letters Patent is the invention as defined in the appended claims.

We claim:

1. Liquid dispensing apparatus of the class described, comprising: a plurality of liquid reservoirs; a dynamically brakeable electric motor; motor driven means operated by said motor for producing relative movement between said reservoirs and a container to be filled therefrom; circuit means for abruptly stopping said motor by dynamic braking thereof; selective means connected to said circuit means for stopping said motor when said container is positioned to receive liquid from a particular one of said reservoirs determined by said selective means; a positive displacement pump connected to dispense liquid from said particular reservoir into said container; means including a power operated shaft for driving said pump and terminating means actuated in accordance with angular displacement of said shaft and disposed to terminate dispensing operation of said pump after a predetermined amount of dispensing operation has occurred.

2. Dispensing apparatus according to claim 1, in which said terminating means comprises presettable volumetric control means for varying said predetermined amount of pumping operation.

3. Dispensing apparatus according to claim 1, further comprising shock absorber means included in said motor driven means.

4. Liquid dispensing apparatus of the class described, comprising: a plurality of liquid reservoirs; a dynamically breakable electric motor; motor driven means operated by said motor for producing relative movement between said reservoirs and a container to receive liquid therefrom; circuit means for abruptly stopping said motor by dynamic braking thereof; presettable selective means for actuating said circuit means to stop said motor when a particular one of said reservoirs preselected by presetting of said selective means is positioned to dispense liquid into said container; a positive displacement pump for dispensing said liquid; means including a power operated shaft for driving said pump; cyclically operative circuit control means actuated by said shaft along with said pump and repeatedly responsive to successive equal angular displacements thereof during dispensing operation of said pump; a stepping switch controlled by said cyclically operative means; terminating means responsive to said stepping switch after operation thereof through a predetermined number of steps starting from a normal position for terminating dispensing operation of said pump; and means for restoring said stepping switch to said normal position.

5. Dispensing apparatus according to claim 4, further comprising volumetric control switching means interconnecting said stepping switch and said terminating means for varying said predetermined number of steps.

6. Dispensing apparatus according to claim 4, further comprising shock absorber means included in said motor driven means.

7. Liquid dispensing apparatus of the class described, comprising: a plurality of reservoirs for retaining different liquids to be dispensed; means for supporting a container to receive at least one of said liquids dispensed from a particular one of said reservoirs; an electric motor; motor driven means operated by said motor and producing relative movement between said reservoirs and said container and causing each of said reservoirs and said container to move through a series of positions relative to each other, each of said reservoirs being in dispensing relationship with respect to said container in one of said positions; braking means for stopping said motor; presettable reservoir selecting means for actuating said braking means to stop said motor when said particular reservoir is positioned in dispensing relationship with respect to said container; a positive displacement pump for dispensing said liquid; means for driving said pump; circuit control means actuated by said pump during dispensing operation thereof; a resettable stepping switch actuated by said circuit control means and comprising a terminal bank including a plurality of uniformly spaced terminals and a wiper brush successively engaging said bank terminals in response to successive actuations of said circuit control means; volumetric control switching means comprising a plurality of terminals connected to different terminals of said bank, said volumetric control switching means further comprising means for selectively establishing contact with a particular one of said terminals of said volumetric control switching means; and terminating means connected to said selective contact establishing means for terminating dispensing action of said pump upon completion of a circuit including said wiper brush and one of said bank terminals.

8. Dispensing apparatus according to claim 7, in which successive terminals of said volumetric control switching means are connected progressively to terminals of at least a portion of said bank separated by at least one intervening bank terminal, the number of said intervening terminals increasing for more advanced positions of said wiper brush.

9. Dispensing apparatus according to claim 7, said braking means stops said motor abruptly, said apparatus further comprising shock absorber means interposed between said braking means and said motor driven means.

10. Dispensing apparatus according to claim 7, in which said braking means comprises electrical switching means for connecting said motor for dynamic braking thereof.

11. Liquid dispensing apparatus of the class described, comprising: a plurality of liquid reservoirs; an electric motor; motor driven means operated by said motor for producing relative movement between said reservoirs and a container to be filled therefrom; braking means for abruptly stopping said motor; resilient means included in said motor driven means for allowing overtravel in said relative movement against the yielding action of said resilient means when said motor is abruptly stopped; selective means connected to said braking means for stopping said motor when said container is positioned to receive liquid from a particular one of said reservoirs; means controlled by said selective means for dispensing liquid from said particular reservoir into said container; and time delay means interposed between said selective means and said dispensing means for preventing operation of said dispensing means until said relative movement has stopped, said time delay means providing a time interval sufficient to permit said resilient means to correct said overtravel by reversal of said relative movement.

12. Dispensing apparatus according to claim 11, in which said braking means comprises electrical switching means for connecting said motor for dynamic braking thereof.

13. Liquid dispensing apparatus of the class described, comprising: a plurality of liquid reservoirs; an electric motor; motor driven means operated by said motor for producing relative movement of said reservoirs and a container to be filled therefrom; braking means for abruptly stopping said motor; a plurality of separate selective means connected to said braking means for stopping said motor when a particular reservoir independently selected in each of said selective means is positioned in dispensing relationship with respect to said container; transfer means interposed between said selective means and said braking means for successively rendering each of said selective means individually effective; a stepping switch common to said plurality of selective means; controllable means for dispensing liquid from said particular reservoir; means for advancing said stepping switch during dispensing operation of said controllable means; and an individual volumetric control means connected to each selective means to be effective therewith for operating said transfer means when said stepping switch has advanced to a position independently determinable by each of said volumetric control means.

14. Apparatus according to claim 13, wherein said braking means includes means for operating said motor at reduced speed immediately prior to said abrupt stoppage thereof.

15. Apparatus according to claim 13, in which said stepping switch advances from a predetermined initial position, said apparatus further comprising means for rapidly restoring said switch to said predetermined initial position after said switch has advanced to a position determined by one of said volumetric control means.

16. Apparatus according to claim 13 in which said controllable means for dispensing said liquid comprises an individual positive displacement pump for recirculating the liquid in each reservoir, means for driving all of said pumps simultaneously, valve means connected to each pump for changing its operation from recirculating to dispensing operation, circuit interrupting means driven with said pump driving means, and means operative during dispensing operation of said pump for causing said circuit interrupting means to control the advance of said stepping switch.

17. Liquid dispensing apparatus of the class described, comprising: a reservoir; means for dispensing liquid from said reservoir; means defining a receiving space wherein different containers of divers capacities may be individually successively positioned to receive liquid dispensed from said reservoir; control means disposed for selective response to containers of different capacities when a container of a particular capacity is positioned in said space to receive said dispensed liquid, actuation of said control means being determined by the magnitude of a characteristic dimension of said container indicative of its capacity; and selectively controllable volumetric proportioning means interconnecting said control means and said dispensing means for proportioning the amount of liquid dispensed by said dispensing means in accordance with the volumetric capacity of said container as determined by its selective actuation of said control means.

18. Apparatus according to claim 17 further comprising means controlled by said control means and actuated by a container of minimum dimensions for preventing operation of said dispensing means unless a container of at least minimum dimensions is positioned in said space to receive said liquid.

19. Apparatus according to claim 17, in which said control means comprises a series of individually actuable circuit control means disposed in vertically spaced relationship disposed at one side of said space and in which said characteristic container dimension is the height thereof.

20. Liquid dispensing apparatus of the class described, comprising: a plurality of liquid reservoirs; an electric motor; motor driven means operated by said motor for producing relative movement between said reservoirs and a container to receive liquid therefrom; braking means for abruptly stopping said motor; a plurality of presettable selective means for actuating said braking means to stop said motor when a particular one of said reservoirs preselected by presetting of one of said selective means is positioned to dispense liquid into said container; a positive displacement pump for dispensing said liquid; means for driving said pump; circuit control means actuated along with said pump during dispensing operation thereof; a stepping switch controlled by said circuit control means; a plurality of volumetric control switching means connected to said stepping switch, one of said volumetric control means being associated with each of said presettable selective means; transfer means responsive to operation of said stepping switch to advance the same to a position determined by one of said volumetric control switching means, said transfer means successively rendering each of said presettable selective means and its associated volumetric control means effective; and dispensing control means for dispensing liquid from said particular reservoir during stepping operation of said stepping switch.

21. Apparatus according to claim 20, further comprising means for initiating operation of said pump driving means and timing means operative during operation of said pump driving means, said timing means preventing operation of said dispensing control means until after a predetermined time interval has elapsed.

22. Apparatus according to claim 21, further comprising additional resettable timing means operative during said operation of said pump driving means, said additional timing means being connected to said pump driving means to stop operation thereof after a predetermined time interval has elapsed, said additional timing means being reset upon dispensing operation of said dispensing control means.

23. Apparatus according to claim 20, further comprising means for resetting said stepping switch to a predetermined initial position after having advanced to a position determined by one of said volumetric control switching means.

24. Apparatus according to claim 23, wherein said transfer means comprises at least one set of relays, said relay set comprising a first relay connected for operation by said stepping switch upon advancing to a position determined by one of said volumetric control switching means and another relay operated when said stepping switch leaves said last named position responsive to said resetting means.

25. Liquid dispensing apparatus of the class described, comprising: a plurality of liquid reservoirs; an electric motor; means driven by said motor for producing relative movement between said reservoirs and a container to be filled therefrom; means for stopping said motor when a predetermined one of said reservoirs is positioned to dispense liquid into said container; a positive displacement pump connected to dispense liquid from said one reservoir into said container; means defining a receiving space for said container wherein containers of divers capacities may be individually successively positioned to receive liquid from said predetermined reservoir; control means disposed for selective response to containers of different capacities when a container of a particular capacity is positioned in said space to receive said dispensed liquid, actuation of said control means being determined by the magnitude of a characteristic dimension of said container indicative of its capacity; selectively controllable volumetric proportioning means operatively interconnecting said control means and said pump for initiating and proportioning the amount of liquid dispensed from said one reservoir in accordance with the capacity of said container as determined by said control means; and terminating means responsive to operation of said pump and disposed to terminate operation of the latter after a predetermined proportioned amount of pumping.

26. Dispensing apparatus according to claim 1, further comprising a plurality of control means selectively actuable by containers of different capacities when one of said containers is positioned to receive liquid from one of said reservoirs, actuation of a particular one of said control means being determined by the capacity of said one container, and proportioning means operatively interconnecting said control means and said pump for proportioning the amount of liquid dispensed from said one reservoir in accordance with the particular one of said control means actuated by said one container.

27. Liquid dispensing apparatus of the class described, comprising: a plurality of reservoirs for retaining different liquids to be dispensed; an individual vertical rotating shaft in each of said reservoirs; agitating members supported by said shaft; a cam carried by said shaft; auxiliary agitating means in said reservoir actuated by said cam; and driving means common to all of said reservoirs for operating said rotating shafts.

28. Liquid dispensing apparatus of the class described, comprising: a plurality of reservoirs for retaining different liquids to be dispensed; an individual vertical rotating shaft in each of said reservoirs; vertically reciprocating means driven by said shaft; a web member covering substantially the entire transverse cross sectional area of said reservoir actuated by said vertically reciprocating means; and driving means common to all of said reservoirs for operating said shafts.

29. Liquid dispensing apparatus of the class described, comprising a plurality of reservoirs each adapted to hold a separate liquid to be dispensed; a separate metering pump associated with each reservoir, each of said pumps having an inlet connected to its associated reservoir and an outlet for delivering liquid from said reservoir into a container into which said liquid is to be dispensed; common supporting means for all of said pumps and said reservoirs; selectively controllable power operated means for producing relative movement between said supporting means and said container, said power operated means including means for bringing said container and a predetermined one of said pump outlets into dispensing position with respect to each other; selectively controllable volumetric means for causing the particular pump which has its outlet dispensing position with respect to said container to pump a predetermined quantity of liquid from its associated reservoir into said container; an individual agitator disposed in each reservoir for agitating the liquid therein; and further power operated means connected to drive all of said agitators, said further power operated means causing all of said agitators to stir all of said liquids each into a state of homogeneity prior to the dispensing operation of any of said pumps.

30. Liquid dispensing apparatus of the class described, comprising a plurality of reservoirs each adapted to hold a separate liquid to be dispensed; a separate metering pump associated with each reservoir, each of said pumps having an inlet connected to its associated reservoir and an outlet for delivering liquid from said reservoir into a container into which said liquid is to be dispensed; revoluble supporting means having a vertical axis of rotation, all of said pumps and all of said reservoirs being carried by said supporting means, all of said pump outlets being arranged in a circle concentric with said axis; means for supporting said container at a predetermined position below said circle, whereby any of said pump outlets may be positioned above said container; selectively controllable power operated means for causing rotary displacement of said supporting means to position a predetermined one of said pump outlets above said container; selectively controllable volumetric means for causing the particular pump which has its outlet positioned above said container to pump a predetermined quantity of liquid from its associated reservoir into said container; an individual agitator disposed in each of said reservoirs; and drive means connected to each of said agitators for stirring the liquid in each reservoir to bring said liquid into a state of homogeneity prior to dispensing operation of the pump associated with the reservoir in which said agitator is disposed.

31. Liquid dispensing apparatus according to claim 30 and wherein said agitator includes a rotary shaft extending into said reservoir, and an impeller mounted on said shaft below the surface of the liquid in said reservoir.

32. Liquid dispensing apparatus according to claim 31, further comprising power operated driving means connected to drive all of said shafts simultaneously.

33. Liquid dispensing apparatus of the class described, comprising a plurality of reservoirs each adapted to hold a separate liquid to be dispensed; a separate metering pump associated with each reservoir, each of said pumps having an inlet connected to its associated reservoir and an outlet for delivering liquid from said reservoir into a container into which said liquid is to be dispensed; selectively controllable volumetric means for causing each pump to pump a predetermined quantity of liquid from its associated reservoir into said container; an individual agitator disposed in each reservoir for agitating the liquid therein; and further power operated means connected to drive all of said agitators, said further power operated means causing all of said agitators to stir all of said liquids each into a state of homogeneity prior to the dispensing operation of any of said pumps.

34. Liquid dispensing apparatus of the class described, comprising a plurality of reservoirs each adapted to hold a separate liquid to be dispensed; a separate metering pump associated with each reservoir, each of said pumps having an inlet connected to its associated reservoir and an outlet for delivering liquid from said reservoir into a container into which said liquid is to be dispensed; selectively controllable volumetric means for individually causing each pump to pump a desired predetermined quantiy of liquid, if any, from its associated reservoir into said container; an individual agitator disposed in each of said reservoirs; and drive means connected to each of said agitators for stirring the liquid in each reservoir to bring said liquid into a state of homogeneity prior to dispensing operation of the pump associated with the reservoir in which said agitator is disposed.

35. Paint dispensing apparatus on the class described, comprising a plurality of reservoirs each adapted to hold a paint to be dispensed and mixed with another paint from one of the other reservoirs, a separate metering pump associated with each reservoir, each of said pumps having an inlet connected to its associated reservoir and an outlet for delivering paint from said reservoir into a container into which said liquid is to be dispensed; revoluble supporting means having a vertical axis of rotation, all of said pumps and all of said reservoirs being carried by said supporting means, all of said pump outlets being effectively arranged in a circle concentric with said axis; means for supporting said container at a predetermined position below said circle whereby any of said pump outlets may be positioned above said container; selectively controllable power operated means for causing rotary displacement of said supporting means to position a predetermined one of said pump outlets above said container; selectively controllable volumetric means for causing the particular pump which has its outlet positioned above said container to pump a predetermined quantity of paint from its associated reservoir into said container; means for maintaining the paint in said reservoir in a state of homogeneity prior to the dispensing operation comprising an individual agitator disposed in each reservoir for agitating the paint therein and means responsive to rotary movement of said supporting means connected to drive all of said agitators during the rotation of said supporting means.

36. Paint dispensing apparatus of the class described, comprising a plurality of reservoirs each adapted to hold a paint to be dispensed and mixed with another paint from one of the other reservoirs; a separate metering pump associated with each reservoir, each of said pumps having an inlet connected to its associated reservoir and an outlet for delivering paint from said reservoir into a container into which said liquid is to be dispensed; revoluble supporting means having a vertical axis of rotation, all of said pumps and all of said reservoirs being carried by said supporting means, all of said pump outlets being arranged in a circle concentric with said axis; means for supporting said container at a predetermined position below said circle whereby any of said pump outlets may be positioned above said container; selectively controllable power operated means for causing rotary displacement of said supporting means to position a predetermined one of said pump outlets above said container; selectively controllable volumetric means for causing the particular pump which has its outlet positioned above said container to pump a predetermined quantity of paint from its associated reservoir into said container; means for maintaining the paint in said reservoirs in a state of homogeneity prior to the dispensing operation comprising an individual agitator disposed in each reservoir for agitating the paint therein, each agitator including a rotary shaft having an impeller below the surface of the paint in the reservoir and a driving element at its other end and means responsive to rotary movement of said supporting means for driving all of said agitators during the rotation of said supporting means comprising a flexible driving element embracing the driving members on said agitators in driving relationship thereto, said flexible driving element being in driving engagement with a member fixed relative to said supporting means.

37. Liquid dispensing apparatus of the class described, comprising a plurality of reservoirs each adapted to hold a separate liquid to be dispensed; a separate metering pump associated with each reservoir, each of said pumps having an inlet connected to its associated reservoir and an outlet for delivering liquid from said reservoir into a container into which said liquid is to be dispensed; common supporting means for all of said pumps and said reservoirs; selectively controllable power operated means for producing relative movement between said supporting means and said container, said power operated means including means for bringing said container and a predetermined one of said pump outlets into dispensing position with respect to each other; selectively controllable volumetric means for causing the particular pump which has its outlet in dispensing position with respect to said container to pump a predetermined quantity of liquid from its associated reservoir into said container; means for maintaining the liquid in said reservoirs in a state of homogeneity prior to the dispensing operation comprising an individual agitator disposed in each reservoir for agitating the liquid therein; and means responsive to said relative movement between said supporting means and said container connected to drive all of said reservoirs to stir the liquids in said agitators during such relative movement.

38. Liquid dispensing apparatus of the class described, comprising a plurality of reservoirs each adapted to hold a separate liquid to be dispensed and combined with at least one other liquid from one of the other reservoirs; a separate positive displacement metering pump connected to each reservoir, each of said pumps having an inlet connected to its associated reservoir and an outlet for delivering the liquid from said reservoir into a container into which said liquid is to be dispensed; revoluble supporting means having a vertical axis of rotation, all of said pumps and all of said reservoirs being carried by said supporting means; means for supporting said container at a predetermined position, all of said pump outlets being spaced from said axis whereby any of said pump outlets may be positioned above said container by rotation of said supporting means; selectively controllable power operated means for causing rotary displacement of said supporting means to position a predetermined one of said pump outlets above said container; selectively controllable volumetric means for causing the particular pump which has its outlet positioned above said container to pump a predetermined quantity of paint from its associated reservoir into said container; and separate agitating means in each reservoir for bringing the liquid in said reservoir into a state of homogeneity prior to the dispensing operation, said agitating means being connected for operation by said power operated means during the course of rotary displacement of said supporting means.

39. Liquid dispensing apparatus according to claim 38, wherein said agitating means is connected to be driven by a cooperating driving member which is relatively fixed with respect to said supporting means.

References Cited in the file of this patent

UNITED STATES PATENTS

| Number | Name | Date |
|---|---|---|
| 398,383 | Crommer | Feb. 26, 1889 |
| 509,488 | Potter | Nov. 28, 1893 |
| 564,132 | Wolf | July 14, 1896 |
| 1,607,899 | Long | Nov. 23, 1926 |
| 1,681,929 | Armond et al. | Aug. 28, 1928 |
| 1,983,825 | Van Dam | Dec. 11, 1934 |
| 2,344,599 | Clark | Mar. 21, 1944 |
| 2,355,089 | Le Frank | Aug. 8, 1944 |
| 2,445,291 | Kamm et al. | July 13, 1948 |
| 2,458,978 | Chace | Jan. 11, 1949 |
| 2,460,605 | Soissa | Feb. 1, 1949 |
| 2,517,107 | Hessert | Aug. 1, 1950 |
| 2,616,607 | Perkins | Nov. 4, 1952 |
| 2,643,792 | Daley et al. | June 30, 1953 |
| 2,660,351 | Thompson | Nov. 24, 1953 |